US011049045B2

(12) United States Patent
Funakoshi et al.

(10) Patent No.: US 11,049,045 B2
(45) Date of Patent: Jun. 29, 2021

(54) CLASSIFICATION APPARATUS, ROBOT, AND CLASSIFICATION METHOD

(71) Applicant: HONDA MOTOR CO., LTD., Tokyo (JP)

(72) Inventors: Kotaro Funakoshi, Wako (JP); Naoto Iwahashi, Soja (JP)

(73) Assignee: HONDA MOTOR CO., LTD., Tokyo (JP)

( * ) Notice: Subject to any disclaimer, the term of this patent is extended or adjusted under 35 U.S.C. 154(b) by 761 days.

(21) Appl. No.: 15/352,650

(22) Filed: Nov. 16, 2016

(65) Prior Publication Data
US 2017/0140300 A1  May 18, 2017

(30) Foreign Application Priority Data

Nov. 18, 2015 (JP) .............................. JP2015-225932
Feb. 10, 2016 (JP) .............................. JP2016-024162

(51) Int. Cl.
*G06N 20/10* (2019.01)
*G06N 20/00* (2019.01)
*G10L 15/08* (2006.01)

(52) U.S. Cl.
CPC ............. *G06N 20/10* (2019.01); *G06N 20/00* (2019.01); *G10L 15/08* (2013.01)

(58) Field of Classification Search
CPC ................................. G06N 20/00; G10L 15/08
See application file for complete search history.

(56) References Cited

U.S. PATENT DOCUMENTS

| 8,532,989 | B2 * | 9/2013 | Funakoshi | G10L 15/083 704/240 |
| 2015/0379371 | A1 * | 12/2015 | Yoon | G06K 9/00201 382/103 |
| 2016/0378465 | A1 * | 12/2016 | Venkatesh | G06F 9/3802 712/205 |

FOREIGN PATENT DOCUMENTS

| JP | 2005-309920 A | 11/2005 |
| JP | 2008-102856 | 5/2008 |

(Continued)

OTHER PUBLICATIONS

Sebald, Daniel J., and James A. Bucklew. "Support vector machines and the multiple hypothesis test problem." IEEE Transactions on Signal Processing 49.11 (2001): 2865-2872. (Year: 2001).*

(Continued)

*Primary Examiner* — Luis A Sitiriche
*Assistant Examiner* — Sehwan Kim
(74) *Attorney, Agent, or Firm* — Rankin, Hill & Clark LLP

(57) ABSTRACT

A classification apparatus includes: a calculation unit that outputs, as a classification result, results of classification by each of a plurality of classifiers with respect to learning data formed of data of at least two classes at a learning time and calculates a combination result value obtained by linear combination, using a combination coefficient, of results of classification by each of the plurality of classifiers with respect to the learning data to output the calculated combination result value as the classification result at a classification time; an extraction unit that extracts a correct solution class and an incorrect solution class for each of the classifiers from the classification result; a difference calculation unit that calculates a difference between the correct solution class and the incorrect solution class for each of the classifiers; a conversion unit that calculates a feature vector using (Continued)

the calculated difference for each of the classifiers; and a combination coefficient setting unit that learns, using a support vector machine, a value based on the feature vector with respect to a plurality of the learning data and thereby updates the combination coefficient, wherein input data is classified using the updated combination coefficient.

9 Claims, 10 Drawing Sheets

(56) References Cited

FOREIGN PATENT DOCUMENTS

| JP | 2011-053690 A | 3/2011 |
|---|---|---|
| WO | 2008/084842 A1 | 7/2008 |

OTHER PUBLICATIONS

Shao, Yuan-Hai, Wei-Jie Chen, and Nai-Yang Deng. "Nonparallel hyperplane support vector machine for binary classification problems." Information Sciences 263 (2014): 22-35. (Year: 2014).*

Zhou, Ligang, Kin Keung Lai, and Lean Yu. "Least squares support vector machines ensemble models for credit scoring." Expert Systems with Applications 37.1 (2010): 127-133. (Year: 2010).*

Hester, Todd, and Peter Stone. "TEXPLORE: real-time sample-efficient reinforcement learning for robots." Machine learning 90.3 (2013): 385-429. (Year: 2013).*

Neo, Ee Sian, Takeshi Sakaguchi, and Kazuhito Yokoi. "A natural language instruction system for humanoid robots integrating situated speech recognition, visual recognition and on-line whole-body motion generation." 2008 IEEE/ASME. IEEE, 2008. (Year: 2008).*

Hester, Todd, and Peter Stone. "TEXPLORE: real-time sample-efficient reinforcement learning for robots." Machine learnings 90.3 (2013): 385-429. (Year: 2013).*

Tian, Min, Weiwei Zhang, and Fuqiang Liu. "On-line ensemble SVM for robust object tracking." Asian conference on computer vision. Springer, Berlin, Heidelberg, 2007. (Year: 2007).*

Kim, Hyun-Chul, et al. "Constructing support vector machine ensemble." Pattern recognition 36.12 (2003): 2757-2767. (Year: 2003).*

Hester, Todd, and Peter Stone. "TEXPLORE: real-time sample-efficient reinforcement learning for robots." Machine learning 90.3 (2013): 385-429. (Year: 2013).*

Sebald, Daniel J., and James A. Bucklew. "Support vector machines and the multiple hypothesis test problem." IEEE Transactions on Signal Processing 49.11 (2001): 2865-2872. (Year: 2001).*

Shao, Yuan-Hai, Wei-Jie Chen, and Nai-Yang Deng. "Nonparallel hyperplane support vector machine for binary classification problems." Information Sciences 263 (2014): 22-35. (Year: 2014).*

Zhou, Ligang, Kin Keung Lai, and Lean Yu. "Least squares support vector machines ensemble models for credit scoring." Expert Systems with Applications 37.1 (2010): 127-133. (Year: 2010).*

Japanese Notice of Allowance, Application No.2016-024162, dated Nov. 19, 2019, with English translation, 6 pages.

Uchiyama, et al. "A Multi-Classifier Combination Using Confidence Estimation", Proceedings of 84th Meeting of JSAI—KBS, Japanese Society for Artificial Intelligence, Jan. 20, 2009, pp. 33-38, with English Abstract, 7 pages.

* cited by examiner

FIG. 2 g1

| SPEECH SIGNAL | MOTION CLASSIFICATION CLASS | COMBINATION MODEL $G_j(x_i)$ FOR EACH CLASS | FEATURE VECTOR $D_i$ | LABEL |
|---|---|---|---|---|
| SPEECH SIGNAL $x_1$ | $CLASS_1$ | $G_1(x_1), G_2(x_1), \ldots, G_J(x_1)$ | $D_1 = (d_{1,1}, d_{2,1}, d_{3,1}, d_{4,1})$ | +1 |
| SPEECH SIGNAL $x_2$ | $CLASS_2$ | $G_1(x_2), G_2(x_2), \ldots, G_J(x_2)$ | $D_2 = (d_{1,2}, d_{2,2}, d_{3,2}, d_{4,2})$ | +1 |
| SPEECH SIGNAL $x_3$ | $CLASS_3$ | $G_1(x_3), G_2(x_3), \ldots, G_J(x_3)$ | $D_3 = (d_{1,3}, d_{2,3}, d_{3,3}, d_{4,3})$ | +1 |
| ... | ... | ... | ... | ... |
| SPEECH SIGNAL $x_n$ | $CLASS_J$ | $G_1(x_n), G_2(x_n), \ldots, G_J(x_n)$ | $D_n = (d_{1,n}, d_{2,n}, d_{3,n}, d_{4,n})$ | +1 | g11, g12 g2

| MOTION CLASSIFICATION CLASS | MOTION NAME | REQUIRED SLOT |
|---|---|---|
| $CLASS_1$ | BRING | LOCATION, ITEM |
| $CLASS_2$ | TURN ON (THE LIGHT) | LOCATION, ITEM |
| ... | ... | ... |
| $CLASS_J$ | RETURN | LOCATION, ITEM |

FIG. 9

| COMBINATION COEFFICIENT | FULL SEARCH | METHOD OF PRESENT EMBODIMENT |
|---|---|---|
| $W_1$ | 0.2 | 0.000948 |
| $W_2$ | 0.2 | 0.161839 |
| $W_3$ | 0.1 | 0.000779 |
| $W_4$ | 1 | 0.018409 |

FIG. 10

| COMBINATION COEFFICIENT | ACCURACY (%) | CALCULATION TIME (SECOND) |
|---|---|---|
| INITIAL VALUE | 77.0 | – |
| FULL SEARCH | 87.6 | 26401 (7 HOURS 20 MINUTES 1 SECOND) |
| METHOD OF PRESENT EMBODIMENT | 86.7 | 35 |

CLASSIFICATION APPARATUS, ROBOT, AND CLASSIFICATION METHOD

CROSS-REFERENCE TO RELATED APPLICATION

Priority is claimed on Japanese Patent Application No. 2015-225932, filed on Nov. 18, 2015 and Japanese Patent Application No. 2016-024162, filed on Feb. 10, 2016, the contents of which are incorporated herein by reference.

BACKGROUND

Field of the Invention

The present invention relates to a classification apparatus, a robot, and a classification method.

Background

A method has been proposed in which a plurality of element models are linearly combined to generate a combination model and a weighting is performed by multiplying each element model by a linear combination coefficient to improve an classification accuracy in the combination model. In such a method, if a classification ratio with respect to all combinations of possible values is calculated and a combination at which the classification ratio is maximized is obtained, the classification accuracy as the combination model (classifier) is improved.

In such a method, the number of combinations of possible values is, for example, $M^K$ when the search number of each coefficient is M and the number of element models is K. Therefore, when the search number and the number of element models are large, the calculation amount becomes huge, and there is a case in which it becomes substantially impossible to perform the calculation using a general workstation.

As a method for reducing the calculation amount, a classification apparatus has been proposed in which the element models are linearly combined by extracting feature vectors from an input pattern and obtaining a scalar product of the vectors (for example, refer to Japanese Unexamined Patent Application, First Publication No. 2008-102856).

SUMMARY

However, according to the technique described in Japanese Unexamined Patent Application, First Publication No. 2008-102856, there is a problem in that it is necessary to obtain a scalar product for each input vector, and the calculation amount is increased.

In view of the foregoing, an object of an aspect of the present invention is to provide a classification apparatus, a robot, and a classification method capable of reducing a calculation amount.

(1) In order to achieve the above object, a classification apparatus according to an aspect of the present invention includes: a calculation unit that outputs, as a classification result, results of classification by each of a plurality of classifiers with respect to learning data formed of data of at least two classes at a learning time and calculates a combination result value obtained by linear combination, using a combination coefficient, of results of classification by each of the plurality of classifiers with respect to the learning data formed of data of at least two classes to output the calculated combination result value as the classification result at a classification time; an extraction unit that extracts a correct solution class and an incorrect solution class other than the correct solution class for each of the classifiers from the classification result; a difference calculation unit that calculates the difference between the correct solution class and the incorrect solution class for each of the classifiers; a conversion unit that calculates a feature vector using the calculated difference for each of the classifiers; and a combination coefficient setting unit that learns, using a support vector machine, a value based on the feature vector with respect to a plurality of the learning data and thereby updates the combination coefficient, wherein input data is classified using the updated combination coefficient.

(2) In the classification apparatus according to an aspect of the present invention, the extraction unit may extract all the incorrect solution classes from the classification result, and the difference calculation unit may calculate a difference between the correct solution class and all the incorrect solution classes for each of the classifiers and separately for each class.

(3) In the classification apparatus according to an aspect of the present invention, the calculation unit may output, as the classification result, a combination result value obtained by linear combination, using a combination coefficient, of results of classification by each of the plurality of classifiers with respect to the learning data formed of data of at least two classes at a learning time, the extraction unit may extract a maximum value of the classification result other than the correct solution class from the classification result, and the difference calculation unit may calculate a difference between a classification result of learning data in the correct solution class and a classification result of learning data in a class in which the classification result is maximum in the incorrect solution class for each of the classifiers.

(4) In the classification apparatus according to an aspect of the present invention, the conversion unit may convert the calculated feature vector to the value based on the feature vector by adding a +1 label that indicates a correct solution class to the calculated feature vector, and the combination coefficient setting unit may update the combination coefficient to a combination coefficient at which a margin between a classification boundary and a support vector is maximized.

(5) In the classification apparatus according to an aspect of the present invention, the classification boundary may pass through the origin.

(6) In the classification apparatus according to an aspect of the present invention, an initial value of the combination coefficient may be one, and the combination coefficient setting unit may repeat learning until the margin between the classification boundary and the support vector converges to update the combination coefficient.

(7) In the classification apparatus according to an aspect of the present invention, the learning data and the input data may be a speech signal that includes a word representing a command of motion and a noun, and each of the plurality of classifiers may be a classifier that performs speech recognition, a classifier that classifies a word representing a motion included in a result of the speech recognition, a classifier that classifies a noun included in the result of the speech recognition, and a classifier that classifies whether or not the word representing the motion and the noun have been extracted without excess and deficiency.

(8) In order to achieve the above object, a robot according to another aspect of the present invention includes a classification apparatus according to any one of (1) to (7), wherein a speech signal of the learning data is a speech signal of a command that prompts a motion of the robot.

(9) In order to achieve the above object, a classification method according to another aspect of the present invention includes: (a) by way of a calculation unit, outputting, as a classification result, results of classification by each of a plurality of classifiers with respect to learning data formed of data of at least two classes at a learning time and calculating a combination result value obtained by linear combination, using a combination coefficient, of results of classification by each of the plurality of classifiers with respect to the learning data formed of data of at least two classes to output the calculated combination result value as the classification result at a classification time; (b) by way of an extraction unit, extracting a correct solution class and an incorrect solution class other than the correct solution class for each of the classifiers from the classification result; (c) by way of a difference calculation unit, calculating a difference between the correct solution class and the incorrect solution class for each of the classifiers; (d) by way of a conversion unit, calculating a feature vector using the calculated difference for each of the classifiers; (e) by way of the conversion unit, calculating a feature vector using the calculated difference for each of the classifiers and converting the calculated feature vector to a value based on the feature vector by adding a +1 label that indicates a correct solution class to the calculated feature vector; (f) by way of a combination coefficient setting unit, learning, using a support vector machine, the value based on the feature vector with respect to a plurality of the learning data and thereby updating the combination coefficient to a combination coefficient at which the margin between a classification boundary that passes through an origin and a support vector is maximized.

According to the configuration of (1), (8), or (9) described above, by using the difference between the correct solution class and the incorrect solution class, it is possible to normalize data when seen from the support vector machine. Therefore, it is possible to suitably obtain a classification plane, and therefore, it is possible to improve the classification accuracy.

According to the configuration of (2) described above, in a calculation phase of the support vector machine, the calculation is performed using all data of the incorrect solution class, and therefore, it is possible to reduce a case in which the calculation falls in a local solution.

According to the configuration of (3) described above, a data analysis result according to a classification method using the support vector machine is used, and the linear combination coefficient is obtained. Therefore, the calculation amount is greatly reduced, and therefore, the process time can be shortened.

According to the configuration of (4), (5), or (6) described above, it is possible to improve the classification accuracy.

According to the configuration of (7) described above, by using the learning data, it is possible to set the combination coefficient of each of the four classifiers. It is possible to improve the classification accuracy by performing speech recognition using the set combination coefficient.

BRIEF DESCRIPTION OF THE DRAWINGS

FIG. 2 is a view showing an example of data stored by a learning sample database according to the first embodiment.

FIG. 9 is a view showing the obtained combination coefficient.

FIG. 10 is a view showing the accuracy in sample data and the calculation time of a combination coefficient.

DESCRIPTION OF THE EMBODIMENTS

First, a configuration of a classification apparatus 1 included in a robot 2 of the present embodiment is described.

Figure 1:
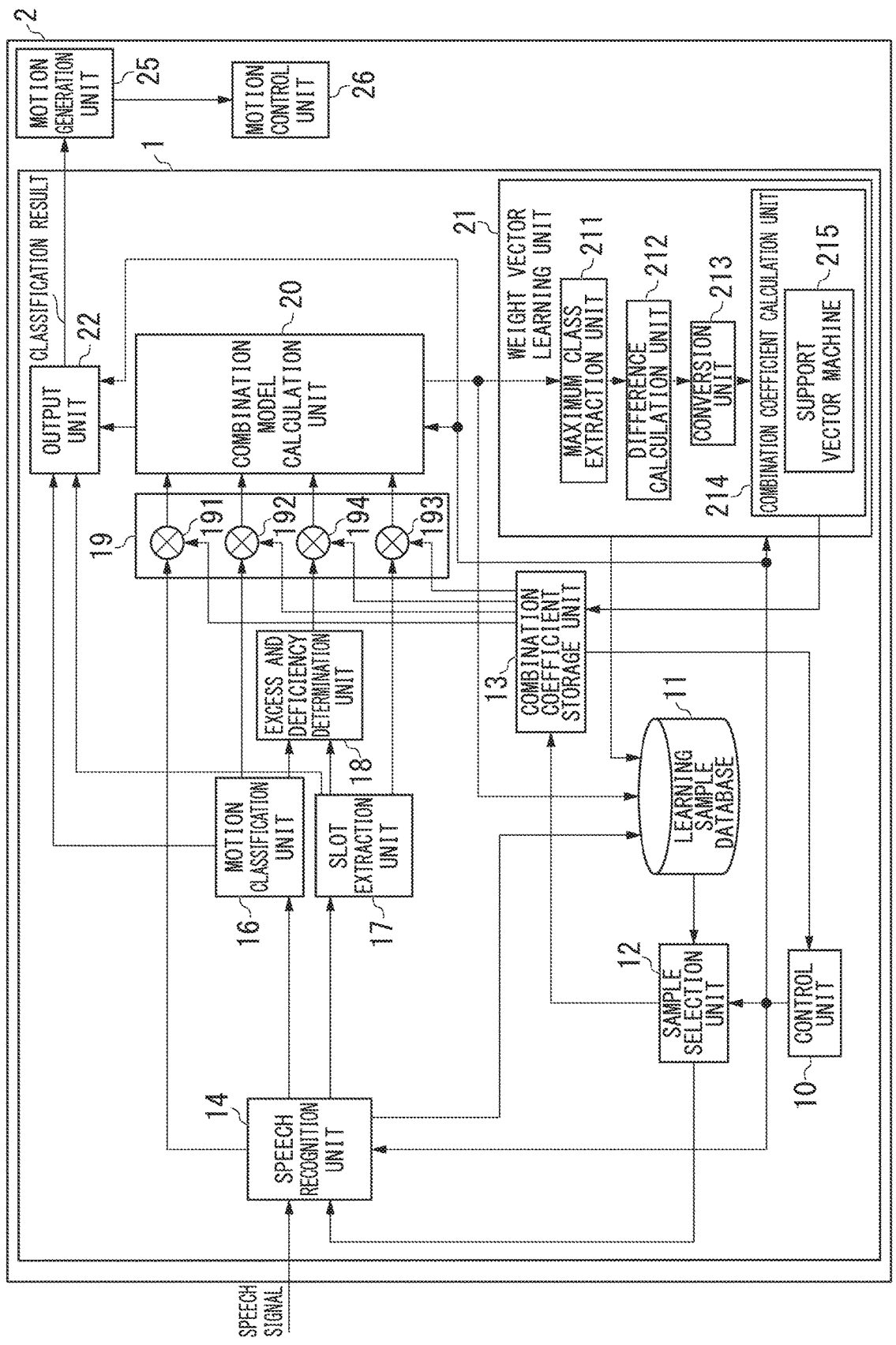
FIG. 1 is a block diagram showing a schematic configuration of a classification apparatus included in a robot according to a first embodiment.

FIG. 1 is a block diagram showing a schematic configuration of the classification apparatus 1 included in the robot 2 according to present embodiment. The present embodiment is described using an example in which the robot 2 includes the classification apparatus 1; however, a classification result of classification by the classification apparatus 1 may be output to the robot 2. Further, a vehicle, a mobile terminal, or the like may include the classification apparatus of the present embodiment or may acquire a classification result from the classification apparatus 1.

As shown in FIG. 1, the robot 2 includes the classification apparatus 1, a motion generation unit 25, and a motion control unit 26. The classification apparatus 1 includes a control unit 10, a learning sample database 11, a sample selection unit 12, a combination coefficient storage unit 13, a speech recognition unit 14, a motion classification unit 16, a slot extraction unit 17, an excess and deficiency determination unit 18, a multiplication unit 19, a combination model calculation unit 20 (calculation unit), a weight vector learning unit 21, and an output unit 22. The multiplication unit 19 includes a multiplier 191 to a multiplier 194. The weight vector learning unit 21 includes a maximum class extraction unit 211 (extraction unit), a difference calculation unit 212, a conversion unit 213, and a combination coefficient calculation unit 214. The combination coefficient calculation unit 214 includes a support vector machine 215. In the present embodiment, each of the speech recognition unit 14, the motion classification unit 16, the slot extraction unit 17, and the excess and deficiency determination unit 18 is a classifier.

The classification apparatus 1 acquires, for example, a speech signal of a command (including an instruction) to the robot 2 and outputs a classification result of the acquired speech signal to the robot 2. When the speech signal is a command, the classification result includes a verb that indicates a motion, a noun that indicates a location or an item, or the like.

The robot 2 is, for example, a humanoid robot capable of walking with two legs. The robot 2 moves based on the classification result that is output by the classification apparatus 1. That is, the robot 2 moves in response to a command. The motion generation unit 25 acquires the classification result output by the classification apparatus 1 and generates a motion command based on the acquired classification result. The motion command is a command of motion to the robot 2 and is, for example, a command to cause the robot 2 to "bring a fork from the kitchen". The motion generation unit 25 outputs the generated motion command to the motion control unit 26. The motion control unit 26 controls a drive part (not shown) such as a motor included in the robot 2 in response to the motion command output by the motion generation unit 25.

First Embodiment

Next, each part of the classification apparatus 1 according to the present embodiment is described.

The control unit 10 controls the classification apparatus 1 to switch between a learning mode and a classification mode. The learning mode is an operation mode in which learning is performed using sample data stored by the learning sample database 11, and a linear combination coefficient (hereinafter, simply referred to as a combination coefficient) is set. The classification mode is an operation mode in which a speech signal acquired from an external apparatus is classified using the combination coefficient set in the learning mode. The external apparatus is, for example, a sound collection apparatus, a sound recorder, or the like. When controlling the classification apparatus 1 in the learning mode, the control unit 10 outputs information indicating the learning mode to the sample selection unit 12, the speech recognition unit 14, the combination model calculation unit 20, and the weight vector learning unit 21. When controlling the classification apparatus 1 in the classification mode, the control unit 10 outputs information indicating the classification mode to the speech recognition unit 14, the combination model calculation unit 20, and the output unit 22. The control unit 10 controls the classification apparatus 1 in the learning mode such that an initialized combination coefficient W is used at a first learning time, a combination coefficient W updated by the weight vector learning unit 21 is used at a second learning time or thereafter, and the learning is repeated until a classification performance is within a predetermined range. The control unit 10 reads out a combination coefficient stored by the combination coefficient storage unit 13 and, when the classification performance is within the predetermined range, determines that the combination coefficient has converged to end the learning mode. In the classification mode, the control unit 10 performs classification using the combination coefficient set in the learning mode.

The learning sample database 11 stores a plurality of sample data in advance. The sample data are speech signals. Each of the speech signals is stored in association with information indicating a motion classification class (hereinafter, simply referred to as a class) corresponding to the speech signal. The learning sample database 11 stores L (L is an integer equal to or more than two) motion classification class and information required for a motion in advance. The class, the combination model for each class, the feature vector, and the label are described below.

When the control unit 10 outputs information indicating the learning mode, the sample selection unit 12 initializes all combination coefficients stored by the combination coefficient storage unit 13, for example, to one. At each time of acquiring information indicating the learning mode, the sample selection unit 12 selects one from the sample data stored by the learning sample database 11 and outputs the selected sample data to the speech recognition unit 14.

The combination coefficient storage unit 13 stores the combination coefficient W ($w_1$, $w_2$, $w_3$, $w_4$).

When the control unit 10 outputs information indicating the learning mode, the speech recognition unit 14 acquires a speech signal which is sample data output by the sample selection unit 12. Alternatively, when the control unit 10 outputs information indicating the classification mode, the speech recognition unit 14 acquires a speech signal $x_i$ (i is an integer of one to n; n is an integer equal to or more than two) from the external apparatus. In the following description, the speech signal acquired from the external apparatus is a command (including an instruction) to the robot 2 including the classification apparatus 1. Hereinafter, an example is described in which the speech signal is a command $x_n$ (n is an integer equal to or more than one). The command $x_n$ is, for example, "Please bring a fork from the kitchen". The speech recognition unit 14 performs the following process for each command. The speech recognition unit 14 performs speech recognition with respect to the acquired speech signal $x_n$ by using a known method such as a HMM (Hidden Markov Model) or a N-gram and generates text information.

The speech recognition unit 14 stores a language model in the speech recognition unit 14. The speech recognition unit 14 may use, for example, a language model on a network. The language model is a formulated model with respect to a word class of a sentence, a syntactic structure, and a relationship between words, between documents, or the like in a natural language processing or the like. The language model is, for example, a N-gram model, a hidden Markov model, a maximum entropy model, or the like. The speech recognition unit 14 performs, by using a language model, a morphological analysis on the text information obtained by speech recognition. The number of the result of the morphological analysis may be equal to or more than K (K is an integer equal to or more than one) or may be a plural number. The word string of the speech recognition result which is an analysis result includes a verb that indicates a motion to the robot 2, a noun that indicates a location or an item, and the like. For example, when the command is "Please bring a fork from the kitchen", "please bring" is a word including a verb "bring" which indicates a motion, "kitchen" is a noun that indicates a location, and "fork" is a noun that indicates an item.

Further, the speech recognition unit 14 calculates, as a score $S_{1,j}(x_i)$, a degree of reliability for each word included in the word string obtained by speech recognition, for example, by using a method described in "Akinobu Ri, Tatsuya Kawahara, Kiyohiro Shikano, "Reliability calculation method based on high-speed word posteriori probability in two-path search algorithm", Information Processing Society Research Report, 2003-SLP-49-4, 2003-12". The score $S_{1,j}(x_i)$ is, for example, a value of 0.0 to 1.0. The speech recognition unit 14 calculates, for each word string, a score $S_{1,j}(x_i)$ for each word included in the word string. The speech recognition unit 14 outputs, for each word string, the score $S_{1,j}(x_i)$ for each word included in the word string to the multiplier 191. The speech recognition unit 14 outputs, for each word string, a pair of the word string (also referred to as a speech recognition result) and the score $S_{1,j}(x_i)$ for each word included in the word string to the motion classification unit 16 and the slot extraction unit 17.

The motion classification unit 16 performs the following process for each command in the learning mode and the classification mode.

The motion classification unit 16 performs classification, for each K word strings output by the speech recognition unit 14, on a word included in the word string by using L (L is an integer equal to or more than one) support vector machines each performing classification on each of predetermined L motion classification classes. The motion classification unit 16 performs classification, for example, by using a one-versus-rest method. The one-versus-rest method is a method of classifying a sample of a target class as a positive sample and classifying a sample of the rest of classes as a negative sample. The motion classification unit 16 calculates, for each word included in a word string, a score $S_{2,j}(x_i)$, for example, based on a distance to a separation boundary plane in a support vector machine. The motion classification unit 16 outputs the calculated score $S_{2,j}(x_i)$ to the multiplier 192. The motion classification unit 16 outputs, for each word string, a pair of a motion classification result as the result of classification and the score for each word included in the word string to the excess and deficiency determination unit 18 and the output unit 22.

The slot extraction unit 17 performs the following process for each command in the learning mode and the classification mode. The slot extraction unit 17 classifies a noun of a location or an item from the K word strings output by the speech recognition unit 14, for example, by using a CRF (Conditional Random Field). Hereinafter, a noun required for a motion of a robot such as a location or an item is also referred to as a slot. The slot extraction unit 17 calculates, for each word string, a score $S_{3,j}(x_i)$ with respect to a word included in the word string, for example, based on a normalized likelihood and outputs the calculated score $S_{3,j}(x_i)$ to the multiplier 193. The score $S_{3,j}(x_i)$ is, for example, a value of 0.0 to 1.0. The slot extraction unit 17 outputs, for each word string, a pair of a slot extraction result as the result of classification and the score for each word included in the word string to the excess and deficiency determination unit 18 and the output unit 22.

The excess and deficiency determination unit 18 performs the following process for each command in the learning mode and the classification mode. The excess and deficiency determination unit 18 calculates a score $S_{4,j}(x_i)$ that represents whether a slot required for a motion classification class $y_{j\in\{1,\ldots,J\}}$ can be extracted without excess and deficiency based on the motion classification result output by the motion classification unit 16 and the slot extraction result output by the slot extraction unit 17 by using information stored in the learning sample database 11 and outputs the calculated score $S_{4,j}(x_i)$ to the multiplier 194. The score $S_{4,j}(x_i)$ is, for example, a value of 0.0 to 1.0. The multiplication unit 19 performs the following process for each command in the learning mode and the classification mode. The multiplication unit 19 multiplies the score $S_{1,j}(x_i)$ output from the speech recognition unit 14 by a combination coefficient corresponding to the score $S_{1,j}(x_i)$ and stored in the combination coefficient storage unit 13 and outputs a multiplication result value to the combination model calculation unit 20. The multiplication unit 19 multiplies the score $S_{2,j}(x_i)$ output from the motion classification unit 16 by a combination coefficient corresponding to the score $S_{2,j}(x_i)$ and stored in the combination coefficient storage unit 13 and outputs a multiplication result value to the combination model calculation unit 20. The multiplication unit 19 multiplies the score $S_{3,j}(x_i)$ output from the slot extraction unit 17 by a combination coefficient corresponding to the score $S_{3,j}(x_i)$ and stored in the combination coefficient storage unit 13 and outputs a multiplication result value to the combination model calculation unit 20. The multiplication unit 19 multiplies the score $S_{4,j}(x_i)$ output from the excess and deficiency determination unit 18 by a combination coefficient corresponding to the score $S_{4,j}(x_i)$ and stored in the combination coefficient storage unit 13 and outputs a multiplication result value to the combination model calculation unit 20.

The multiplier 191 multiplies the score $S_{1,j}(x_i)$ output from the speech recognition unit 14 by a combination coefficient $w_1$ stored in the combination coefficient storage unit 13 for each word string and outputs a multiplication result value $w_1 \cdot S_{1,j}(x_i)$ to the combination model calculation unit 20. The multiplier 192 multiplies the score $S_{2,j}(x_i)$ output from the motion classification unit 16 by a combination coefficient $w_2$ stored in the combination coefficient storage unit 13 for each word string, for each motion classification class, and for each word included in the word string and outputs a multiplication result value $w_2 \cdot S_{2,j}(x_i)$ to the combination model calculation unit 20. The multiplier 193 multiplies the score $S_{3,j}(x_i)$ output from the slot extraction unit 17 by a combination coefficient $w_3$ stored in the combination coefficient storage unit 13 for each word string and for each word included in the word string and outputs a multiplication result value $w_3 \cdot S_{3,j}(x_i)$ to the combination model calculation unit 20. The multiplier 194 multiplies the score $S_{4,j}(x_i)$ output from the excess and deficiency determination unit 18 by a combination coefficient $w_4$ stored in the combination coefficient storage unit 13 for each word string and outputs a multiplication result value $w_4 \cdot S_{4,j}(x_i)$ to the combination model calculation unit 20.

The combination model calculation unit 20 adds the values $w_1 \cdot S_{1,j}(x_i)$ to $w_4 \cdot S_{4,j}(x_i)$ output by the multiplication unit 19 using Expression (1).

$$G_j(x_i) = w_1 \cdot S_{1,j}(x_i) + w_2 \cdot S_{2,j}(x_i) + w_3 \cdot S_{3,j}(x_i) + w_4 \cdot S_{4,j}(x_i) \tag{1}$$

When the control unit 10 outputs the information indicating the learning mode, the combination model calculation unit 20 outputs, as a classification result (also referred to as a combination result value), the scores $S_{1,j}(x_i)$ to $S_{4,j}(x_i)$ received from the multiplication unit 19 and a value $G_j(x_i)$ obtained by the addition using Expression (1) to the weight vector learning unit 21. When the control unit 10 outputs the information indicating the classification mode, the combination model calculation unit 20 outputs the value $G_j(x_i)$ to the output unit 22.

When the control unit 10 outputs the information indicating the learning mode, the weight vector learning unit 21 calculates a combination coefficient W by using the scores $S_{1,j}(x_i)$ to $S_{4,j}(X_i)$ received via the combination model calculation unit 20 and the value $G_j(x_i)$ output by the combination model calculation unit 20 for each of the plurality of sample data stored by the learning sample database 11.

The maximum class extraction unit 211 determines a correct solution class $y_i$ in the value $G_j(x_i)$ output by the combination model calculation unit 20. The maximum class extraction unit 211 extracts, from the values $G_j(x_i)$ at classes other than the correct solution class $y_i$, a class $y_{max}$ at which the value $G_j(x_i)$ is maximized. The maximum class extraction unit 211 outputs, to the difference calculation unit 212, a value $S_{k,i}(x_i)$ at the correct solution class $y_i$ and a value $S_{k,ymax}(x_i)$ at the extracted class $y_{max}$.

The difference calculation unit 212 calculates a difference $d_{k,i}$ between the value $S_{k,i}(x_i)$ at the correct solution class $y_i$ and the value $S_{k,ymax}(x_i)$ at the class $y_{max}$ for each classifier k using Expression (2) and outputs the calculated difference $d_{k,i}$ for each classifier k to the conversion unit 213. The classifier k=1 corresponds to the speech recognition unit 14. The classifier k=2 corresponds to the motion classification unit 16. The classifier k=3 corresponds to the slot extraction unit 17. The classifier k=4 corresponds to the excess and deficiency determination unit 18. A feature amount which is the above difference is the difference between a correct solution and an incorrect solution. That is, the difference calculation unit 212 calculates a difference between the correct solution class $y_i$ and the class $y_{max}$ at which the value is maximized for each element model (speech recognition unit 14, motion classification unit 16, slot extraction unit 17, excess and deficiency determination unit 18).

$$d_{k,i}=S_{k,i}(x_i)-S_{k,ymax}(x_i) \qquad (2)$$

The conversion unit 213 determines a vector of the difference $d_{k,i}$ for each classifier k output by the difference calculation unit 212 as a feature vector $D_i$ (=($d_{1,i}$, $d_{2,i}$, $d_{3,i}$, $d_{4,i}$)) and further adds, to the feature vector $D_i$, a label +1 that indicates the correct solution class. The conversion unit 213 stores, in the learning sample database 11, the feature vector $D_i$ and the label +1 in association with the speech signal which is the command.

The combination coefficient calculation unit 214 performs learning, using the support vector machine 215, of the feature vector $D_i$ to which the label +1 is added and which is output by the conversion unit 213 with respect to all sample data stored by the learning sample database 11. The combination coefficient calculation unit 214 calculates the combination coefficient W and causes the combination coefficient storage unit 13 to store the calculated combination coefficient W, and thereby, the combination coefficient W is updated.

When the control unit 10 outputs the information indicating the classification mode, the output unit 22 generates a classification result by using text information of a verb and text information of a slot indicating a motion to the robot 2 by which the value $G_j(x_i)$ output by the combination model calculation unit 20 is maximized. The output unit 22 outputs the generated classification result to the motion generation unit 25 of the robot 2.

<Data Stored by Learning Sample Database 11>

Next, data stored by the learning sample database 11 is described.

FIG. 2 is a view showing an example of data stored by the learning sample database 11 according to the present embodiment. As shown by a reference numeral g11 of a reference numeral g1 in FIG. 2, the learning sample database 11 stores, in an initial state, a speech signal which is sample data in association with a motion classification class. The learning sample database 11 stores, for example, a speech signal $x_i$ "Please bring a fork from the kitchen" in association with a class' "bring". The learning sample database 11 stores, for example, a speech signal $x_2$ "Please turn on the light of the next room" in association with a class$_2$ "turn on (the light)".

As shown by a reference numeral g12 of the reference numeral g1 in FIG. 2, the learning sample database 11 stores, in the learning mode, a speech signal in association with a combination model $G_j(x_i)$ for each class, the feature vector $D_i$, and the label. The learning sample database 11 stores, for example, the speech signal $x_1$ "Please bring a fork from the kitchen" in association with a combination model $G_1(x_1)$ for a class$_1$, a combination model $G_2(x_2)$ for a class$_2$, ..., and a combination model $G_J(x_J)$ for a class$_J$, a feature vector $D_1$=($d_{1,1}$, $d_{2,1}$, $d_{3,1}$, $d_{4,1}$), and a label +1.

As shown by a reference numeral g2 in FIG. 2, the learning sample database 11 stores a motion classification class in association with a motion name (word indicating a motion, a verb) and a required slot. For example, the learning sample database 11 stores the class' in association with a motion name "bring" and slots "location", "item" and stores the class$_2$ in association with a motion name "turn on (the light)" and slots "location", "item".

<Combination Coefficient W>

Next, the combination coefficient W updated by the weight vector learning unit 21 is described.

Figure 3:
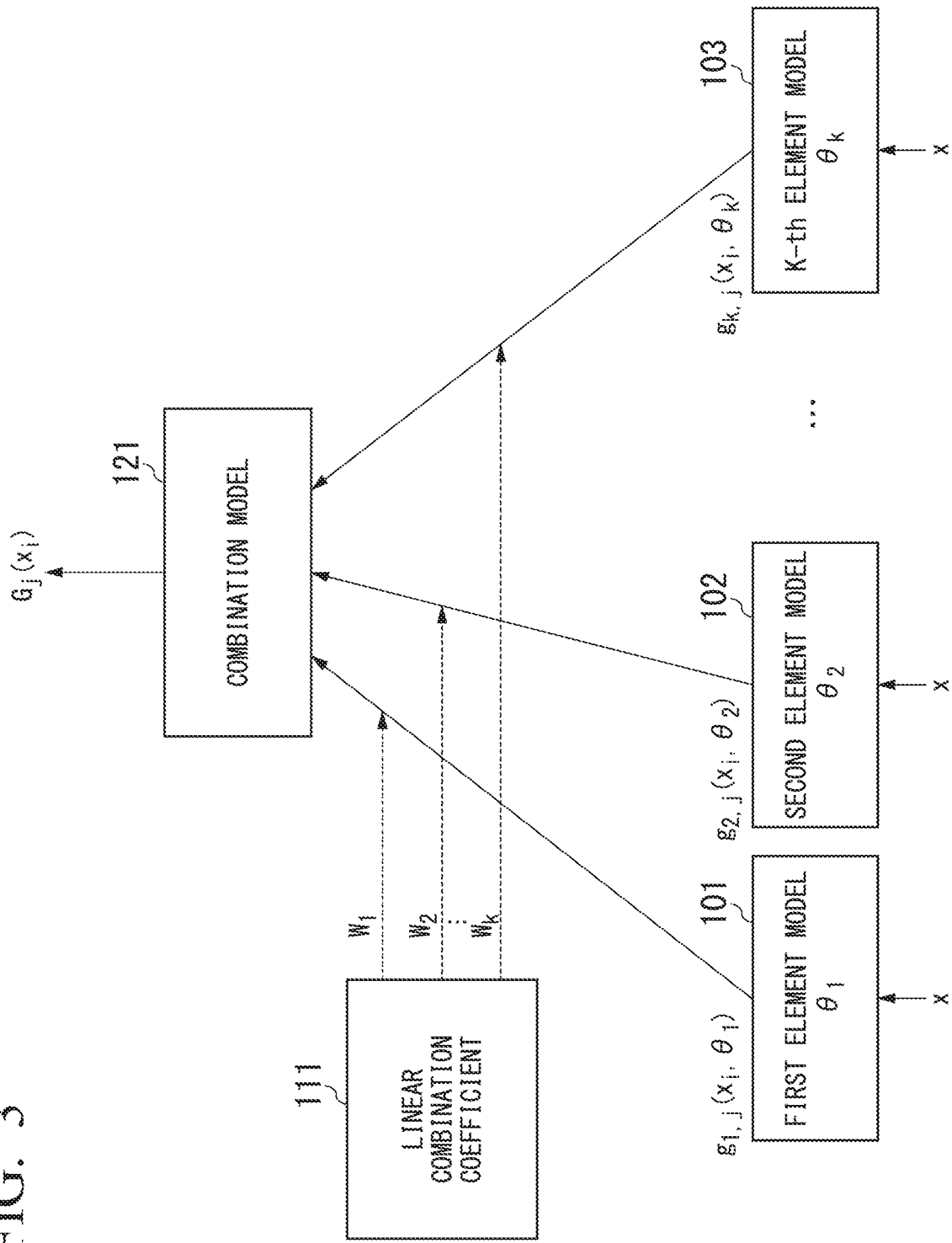
FIG. 3 is a concept view of a classification apparatus obtained by a linear combination of element models as a plurality of classifiers.

FIG. 3 is a concept view of a classification apparatus obtained by a linear combination of element models as a plurality of classifiers. Each one of K (K is an integer equal to or more than 2) first element model 101 to K-th element model 103 is a classifier and acquires data x. The classification apparatus forms a combination model 121, using a linear combination coefficient 111, of classification results of the first element model 101 to the K-th element model 103 and performs classification by using the formed combination model 121. In FIG. 3, a case of K=4 is the classification apparatus 1 of the present embodiment. In this case, the first element model 101 corresponds to the speech recognition unit 14, the second element model 102 corresponds to the motion classification unit 16, a third element model corresponds to the slot extraction unit 17, and a fourth element model corresponds to the excess and deficiency determination unit 18.

It is assumed that a training set $\{(x_i, y_i)\}_{i \in [n]}$ formed of n instances is formed of a d-dimensional (d is an integer equal to or more than two) real number vector $x_i \in R^d$ and a correct solution class $y_i \in \{1, \ldots, J\}$ (J is an integer equal to or more than two). The combination coefficient used to combine element models is W=($w_1$, $w_2$, ..., $w_k$).

When an output with respect to a class $y_{j \in [J]}$ of an element model $k \in [K]$ is represented as $g_{kj}(k_i)$ and the classification apparatus 1 in sample data $x_i$ is defined as a classifier $h(x_i)$, the classifier $h(x_i)$ can be obtained by Expression (3).

$$h(x_i)=\text{argmax}_j G_j(x_i) \qquad (3)$$

In Expression (3), argmax [•] is a function that selects a value of domain of definition which maximizes a function value, and $G_j(x_i)$ is represented by Expression (4).

$$G_j(x_i)=w_1 g_{1j}(x_i)+w_2 g_{2j}(x_i)+ \ldots w_k g_{Kj}(x_i) \qquad (4)$$

Expression (3) and Expression (4) represent that a combination coefficient W that maximizes the output of the combination model of the correct solution class in any sample data $x_i$ is an optimum combination coefficient. In the present embodiment, the combination coefficient W is calculated by performing learning, using the support vector machine 215, with respect to the sample data $x_i$ stored by the learning sample database 11. In Expression (4), $g_{k,i(x)}$ represents an output with respect to a class $c_i$ of a k-th element model.

Next, a process performed by the conversion unit 213 and the combination coefficient calculation unit 214 is described in detail.

Figure 4:
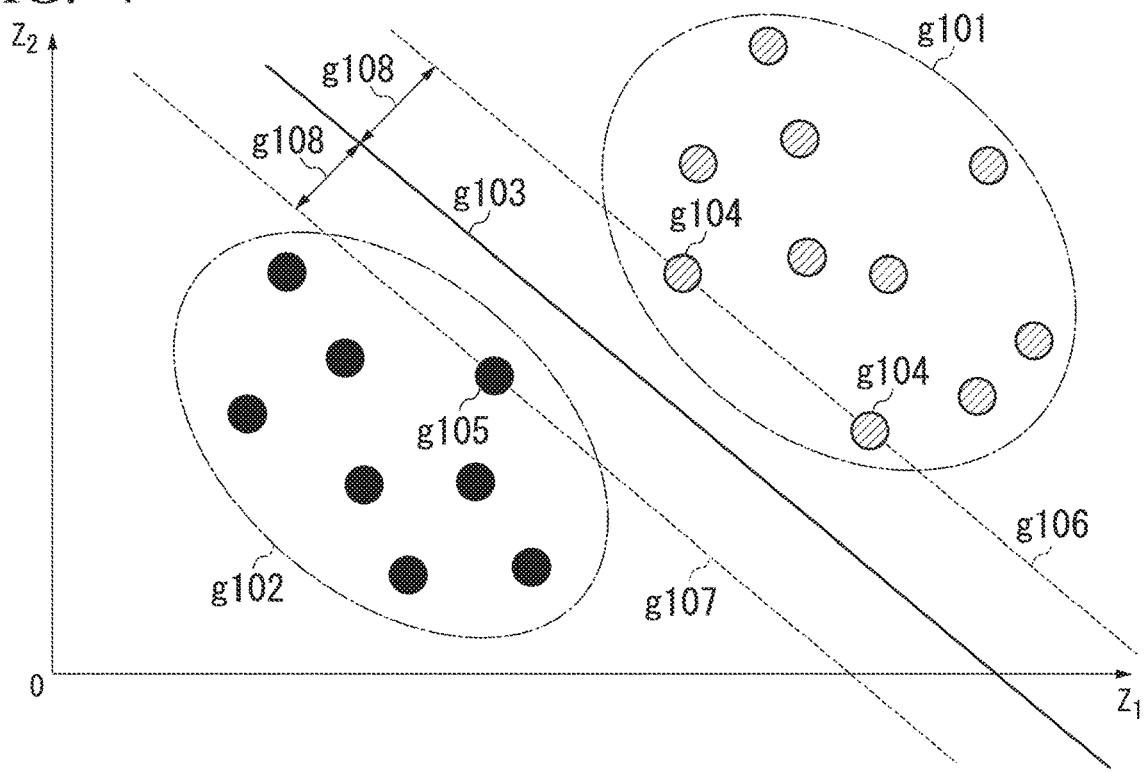
FIG. 4 is a view showing a classification method using a support vector machine according to the related art.

FIG. 4 is a view showing a classification method using a support vector machine according to the related art. The example shown in FIG. 4 is an example in which sample data formed of labels (+1, −1) is used and is classified into two classes. In FIG. 4, the horizontal axis is $z_1$, and the vertical axis is $z_2$. A class having a label (+1) is a first class, and a class having a label (−1) is a second class.

A region surrounded by a chain line g101 represents the first class. A region surrounded by a chain line g102 represents the second class. A line g103 represents a separation boundary plane (also referred to as a hyperplane) ($w^T z_i − h = 0$, h is a threshold value) that classifies the first class and the second class. A reference numeral g104 represents a support vector of the first class. A reference numeral g105 represents a support vector of the second class. A reference numeral g108 represents a margin between the hyperplane and the support vector. A chain line g106 represents a plane that passes through the support vector of the first class, has a maximum margin, and is parallel with the hyperplane. A chain line g107 represents a plane that passes through the support vector of the second class, has a maximum margin, and is parallel with the hyperplane. In the classifier that uses a general support vector machine, a hyperplane that maximizes the margin is calculated.

First, it is assumed that in the classifier $h(x_i)$, "w" at which all instances become the correct solution is present. In this case, it is assumed that the training set can be classified by "w" (also referred to as a hard margin). When the classification has succeeded with respect to a class $y_i$, the relationship between the class $y_i$ and the classifier $h(x_i)$ is represented by Expression (5).

$$y_i = h(x_i) \quad (5)$$

The relationship of Expression (6) is derived from Expression (5).

$$\sum_{k=1}^{K} w_k g_{k,y_i}(x_i) - \sum_{k=1}^{K} w_k g_{k,\hat{j}}(x_i) > 0 \quad (6)$$

$$\text{here, } \hat{j} = \underset{j \neq y_i}{\mathrm{argmax}} G_j(x_i)$$

In Expression (6), $\hat{j}$ represents a label that maximizes the value $G_j(x_i)$ other than the correct solution label. Therefore, in a training set that can be classified, "w" that satisfies Expression (6) with respect to all $i \in [n]$ is present. Expression (6) is transformed into Expression (7).

$$\sum_{k=1}^{K} w_k \{g_{k,y_i}(x_i) - g_{k,\hat{j}}(x_i)\} > 0 \quad (7)$$

Expression (7) is normalized using a norm of the vector w into Expression (8). In Expression (8), $\|\cdot\|$ represents a norm.

$$\frac{\sum_{k=1}^{K} w_k \{g_{k,y_i}(x_i) - g_{k,\hat{j}}(x_i)\}}{\|w\|} > 0 \quad (8)$$

Since "w" to be obtained maximizes minimum values of the left-hand values for all $i \in [n]$, an estimate value $\hat{w}$ is represented by Expression (9).

$$\hat{w} = \underset{w}{\mathrm{argmax}} \underset{i}{\min} \frac{\sum_{k=1}^{K} w_k z_{i,k}}{\|w\|} \quad (9)$$

In Expression (9), when $z_{i,k}$ is represented by Expression (10), the relationship of Expression (11) is obtained.

$$z_{i,k} = g_{k,y_i}(x_i) - g_{k,\hat{j}}(x_i) \quad (10)$$

$$\frac{\sum_{k=1}^{K} w_k z_{i,k}}{\|w\|} > 0 \quad (11)$$

Here, a boundary of $\sum_{k=1}^{K} w_k z_{i,k} = 0$ is referred to as a classification boundary.

Further, Expression (11) becomes Expression (12) in a case of $z_i = [z_{i,1}, \ldots, z_{i,k}]^T$.

$$\frac{w^T z_i}{\|w\|} > 0 \quad (12)$$

Figure 5:
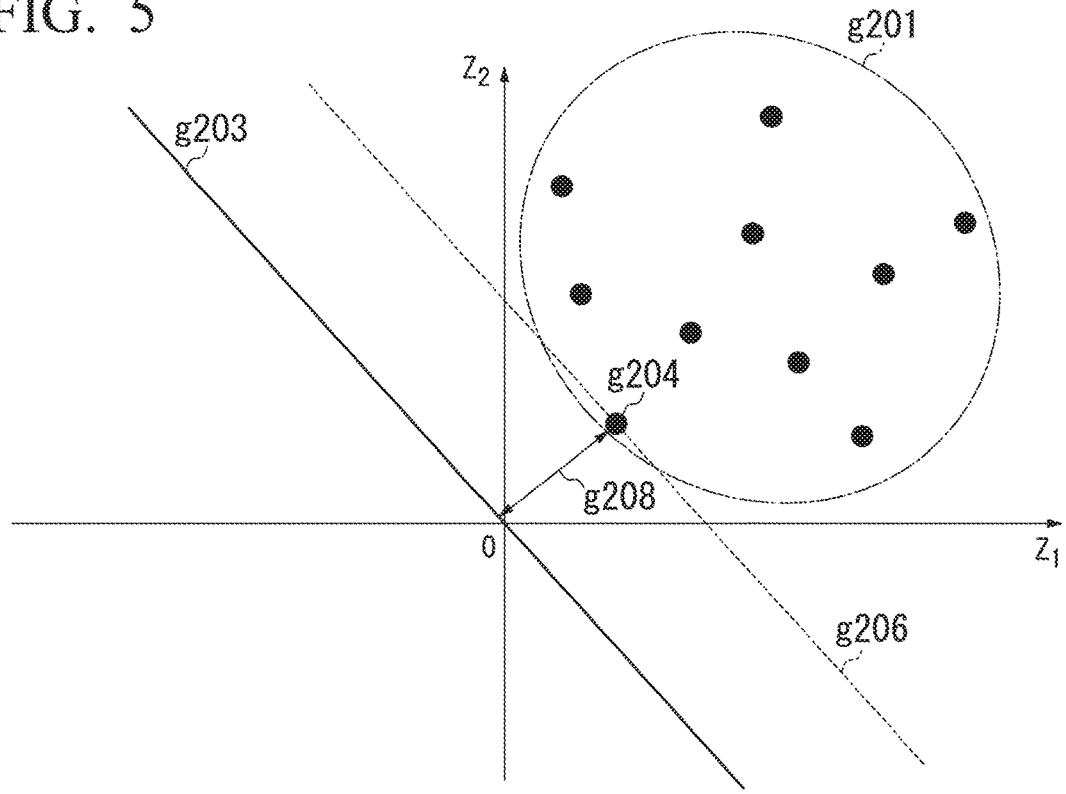
FIG. 5 is a view showing an example of a hard margin according to the first embodiment.

As shown in FIG. 5, the relationship of Expression (12) means that all $z_i$ is present in a positive region with respect to the separation boundary plane. Here, the value to be maximized is Expression (13). Expression (13) represents the distance from the separation boundary plane ($w^T z_i = 0$) to $z_i$, that is, a margin.

$$\frac{w^T z_i}{\|w\|} \quad (13)$$

FIG. 5 is a view showing an example of a hard margin according to the present embodiment. The horizontal axis and the vertical axis are similar to those of FIG. 4.

In FIG. 5, a region surrounded by a chain line g201 represents a positive class. A line g203 represents a separation boundary plane. A reference numeral g204 represents a support vector. A chain line g206 represents a plane that passes through the support vector, has a maximum margin, and is parallel with a hyperplane. A reference numeral g208 represents a margin between the separation boundary plane and the hyperplane. Further, $z_i$ is distributed in the first quadrant, and the separation boundary plane g203 is a straight line that passes through the origin O, the second quadrant, and the fourth quadrant.

Here, from a condition that all practice instances are properly classified, $w_k z_{i,k}$ needs to be greater than zero. Here, it is assumed that $w_k z_{i,k} \geq M$ is satisfied with respect to a positive real number M for all $i \in [n]$. At this time, the margin maximization becomes an optimization problem of Expression (14).

$$\underset{w,M}{\max} \frac{M}{\|w\|} \text{ here, } w^T z_i \geq M, i \in [n] \quad (14)$$

Hereinafter, a value $M/\|w\|$ to be obtained in Expression (14) is referred to as a target function. The M value can be preferably great in order to maximize the target function $M/\|w\|$. However, due to the constraint condition $w^T z_i \geq M$, $M$ is $w^T z_i$ or less. Therefore, $M$ is the smallest value of $w^T z_i$ values with respect to all instances. When i that satisfies the condition is î, the target function value becomes Expression (15).

$$\frac{M}{\|w\|} = \frac{w^T z_i}{\|w\|} \quad (15)$$

From Expression (15), the target function value coincides with a distance from the separation boundary plane to the nearest point. Here, when a value w/M that is w divided by M is replaced by w~, Expression (14) is replaced by Expression (16).

$$\max_{\tilde{w}} \frac{1}{\|\tilde{w}\|} \text{ here, } \tilde{w}^T z_i \geq 1, i \in [n] \quad (16)$$

Hereinafter, w~ is redefined by w, and w is used. When considering that the maximum value of $1/\|w\|$ is equivalent to the minimum value of $\|w\|$ that is the reciprocal of $1/\|w\|$, and the minimum value of $\|w\|$ is equivalent to the minimum value of $\|w\|^2$ that is the square of the norm of w, Expression (16) of the optimization problem becomes Expression (17).

$$\min_w \|w\|^2 \text{ here, } w^T z_i \geq 1, i \in [n] \quad (17)$$

The optimization problem is a formulation when a classification possibility is assumed. In the present embodiment, a determination method of w in which a classification possibility is assumed is referred to as a hard margin.

In the hard margin, it is assumed that w that can classify all the practice instances is present; however, there is actually a case in which classification cannot be achieved using the hard margin. Therefore, in the following, an example is described in which an extension called as a soft margin is performed with respect to an instance that cannot be classified using the hard margin.

The extension can be derived by relaxing the constraint condition $w^T z_i \geq 1$ described above. Here, a non-negative variable $\xi_i$ ($\geq 0$, $i \in [n]$) is newly introduced, and the constraint condition $w^T z_i \geq 1$ is changed into Expression (18).

$$w^T z_i \geq 1 - \xi_i$$

here, $i \in [n]$ (18)

Figure 6:
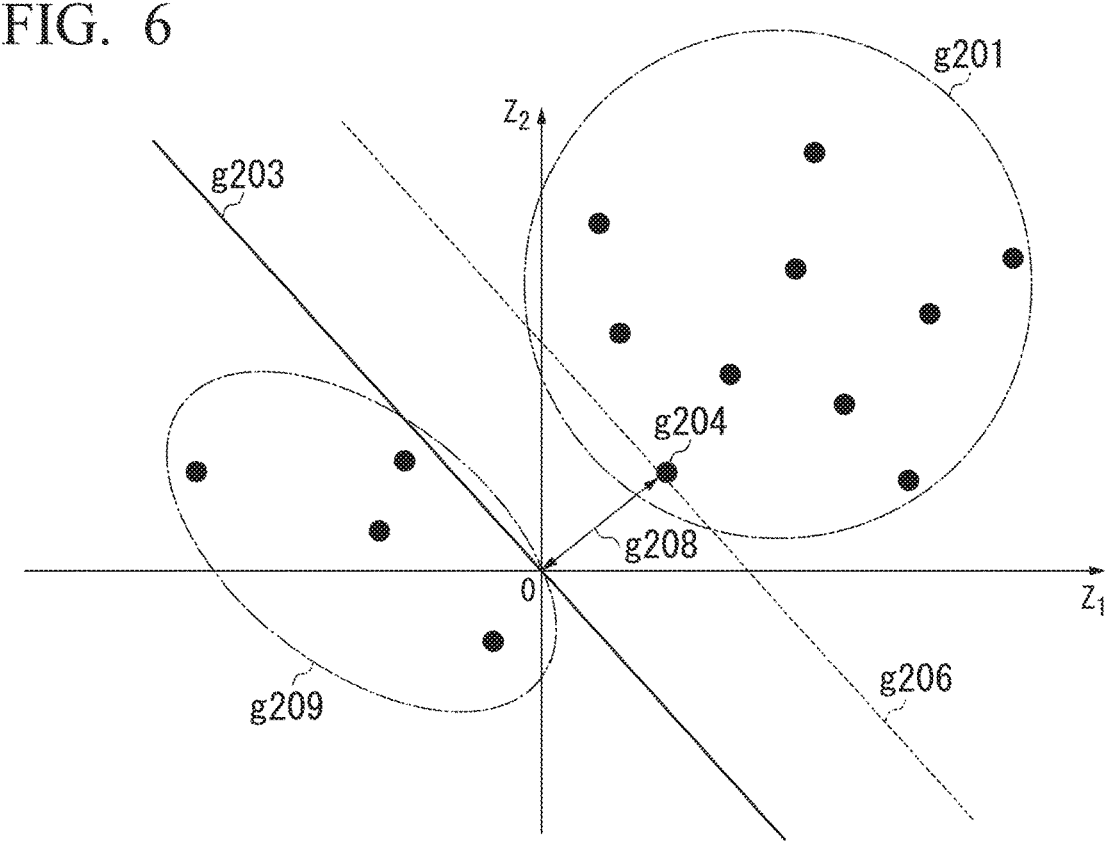
FIG. 6 is a view showing an example of a soft margin according to the first embodiment.

Expression (18) means that since the right-hand side is $1 - \xi_i$, $w^T z_i$ may be smaller by $\xi_i$ than one under the new constraint. The relationship represented in a view is shown in FIG. 6. FIG. 6 is a view showing an example of the soft margin according to the present embodiment. The horizontal axis, the vertical axis, the line g203, the chain line g206, the reference numeral g201, the reference numeral g204, and the reference numeral g208 are similar to those of FIG. 5.

In a region g209 surrounded by a chain line of FIG. 6, $z_i$ is present on the other side (also referred to as a negative side) of a classification boundary plane beyond the margin. In this way, the constraint condition of Expression (18) means that it is allowed for $z_i$ to enter a region on the other side of the classification boundary plane beyond the margin.

Here, $w^T z_i$ is less than zero when an erroneous classification occurs like the region g209 surrounded by the chain line, and therefore, it is required that $\epsilon_i$ is a value more than one in order to the relaxed constraint condition is satisfied. Therefore, for example, when $\Sigma_{i \in [n]} \xi_i$ is an integer L or less, it is possible to avoid the erroneous classification. Therefore, in the soft margin, the target function in the optimization problem is redefined as Expression (19).

$$\min_{w,\xi} \frac{1}{2}\|w\|^2 + C\sum_{i \in [n]} \xi_i \text{ here,} \quad (19)$$

$$w^T z_i \geq 1 - \xi_i, i \in [n]$$

$$\xi_i \geq 0, i \in [n]$$

In Expression (19), $\xi$ is $\xi = [\xi_1, \ldots, \xi_n]^T$. C is a regularization coefficient and is a positive constant. It is necessary to preliminarily set a value to the regularization coefficient. In Expression (19), the first term works for margin maximization similarly to a case of the hard margin. The second term suppresses $\xi_i$ which is a violation degree with respect to the original constraint condition $w^T z_i \geq 1$ such that $\xi_i$ is as small as possible. According to the second term, even when the margin is large, a classification boundary plane by which a large number of erroneous classifications occur is not easily made. A role of the regularization coefficient C is a parameter for adjusting the suppression degree. When C is increased, the soft margin approaches to the hard margin. At $C = \infty$, when the element of $\xi$ has a value, the target function includes an infinity value, and therefore, $\xi$ needs to be always zero. This means that at $C = \infty$, the soft margin coincides with the hard margin. On the contrary, when C is decreased, even if an erroneous classification is made, the target function is not greatly increased, and therefore, an erroneous classification is further easily allowed. Since C depends on data, for example, C is determined by using a cross verification method or the like.

Next, a learning method using a support vector machine in the present embodiment is described. Here, it is assumed that a training set $\{(x_i, y_i)\}_{i \in [n]}$ formed of n instances is formed of a d-dimensional real number vector $x_i \in R^d$ (R represents the whole of real number) and a label $y_i \in \{1, -1\}$ which is a value of +1 or −1. The n instances are sample data stored by the learning sample database 11. It is assumed that the support vector machine 215 is a linear support vector machine. In this case, the optimization problem in the linear support vector machine can be represented by Expression (20).

$$\min_{w,b,\xi} \frac{1}{2}\|w\|^2 + C\sum_{i \in [n]} \xi_i \text{ here,} \quad (20)$$

$$y_i(w^T z_i + b) \geq 1 - \xi_i, i \in [n]$$

$$\xi_i \geq 0, i \in [n]$$

In Expression (20), b represents a $z_2$ intercept in FIG. 5 to FIG. 6.

In the present embodiment, by applying a constraint of $y_i = 1$, $i \in [n]$, $b = 0$ on Expression (20), a combination coefficient W ($= \{w_1, \ldots, w_k\}$) is obtained. Thereby, the separation boundary plane of the present embodiment passes through the origin O differing from the related art. The classification apparatus 1 uses the combination coefficient W obtained in such a way in the classification mode and performs classification.

The data x (sample data or an input speech signal) is described; however, the spaces of FIG. 5 to FIG. 6 may be a feature space. In the present embodiment, the weight vector learning unit 21 calculates a feature vector based on the combination model $G_j(x_i)$ and applies a support vector machine in which a soft margin is extended on a feature space to which a +1 label is further added.

Here, the reason why an optimization is required is further described.

Figure 7:
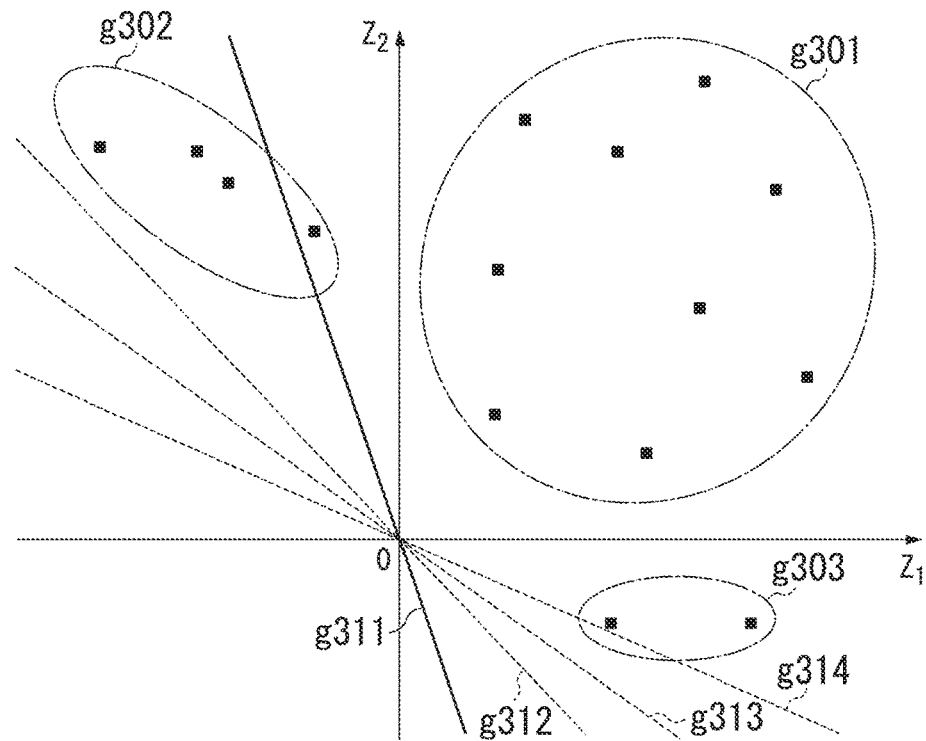
FIG. 7 is a view showing an example in which data are distributed not only in the first quadrant but also in the second quadrant and the fourth quadrant.

FIG. 7 is a view showing an example in which data are distributed not only in the first quadrant but also in the second quadrant and the fourth quadrant. In the example shown in FIG. 7, data z in a region surrounded by a chain line g301 is distributed in the first quadrant, data z in a region surrounded by a chain line g302 is distributed in the second quadrant, and data z in a region surrounded by a chain line g303 is distributed in the fourth quadrant.

In FIG. 7, when the separation boundary plane is a chain line g312, g313, or g314 that passes through the origin O, all data are distributed on the positive side of the separation boundary plane, and therefore, it is possible to perform appropriate classification. On the other hand, a case in which the separation boundary plane is a solid line g311 represents that data are also distributed on the negative side of the separation boundary plane, and therefore, data that cannot be properly classified occur. The separation boundary plane in FIG. 7 is $w_1 z_1 + w_2 z_2 = 0$, and therefore, the slope of the separation boundary plane changes depending on the change of the w value. Therefore, in FIG. 7, an optimization process of the combination coefficients $w_1$, $w_2$ is required.

It is possible to reduce data that distributes on the negative side of the separation boundary plane by setting the separation boundary plane such that the distance to data (support vector) which is the nearest to the separation boundary plane is maximized, that is, the margin is maximized.

Next, the reason why the control unit 10 repeats the optimization process until the combination coefficient W converges is described.

In Expression (6) described above, ĵ of Expression (21) changes depending on the w value. Therefore, in the present embodiment, the optimization process is repeated until the combination coefficient W converges.

$$\hat{j} = \underset{j \neq y_i}{\mathrm{argmax}} G_j(x_i) \quad (21)$$

Next, an update method of the combination coefficient W in the learning mode in the present embodiment is described.

Figure 8:
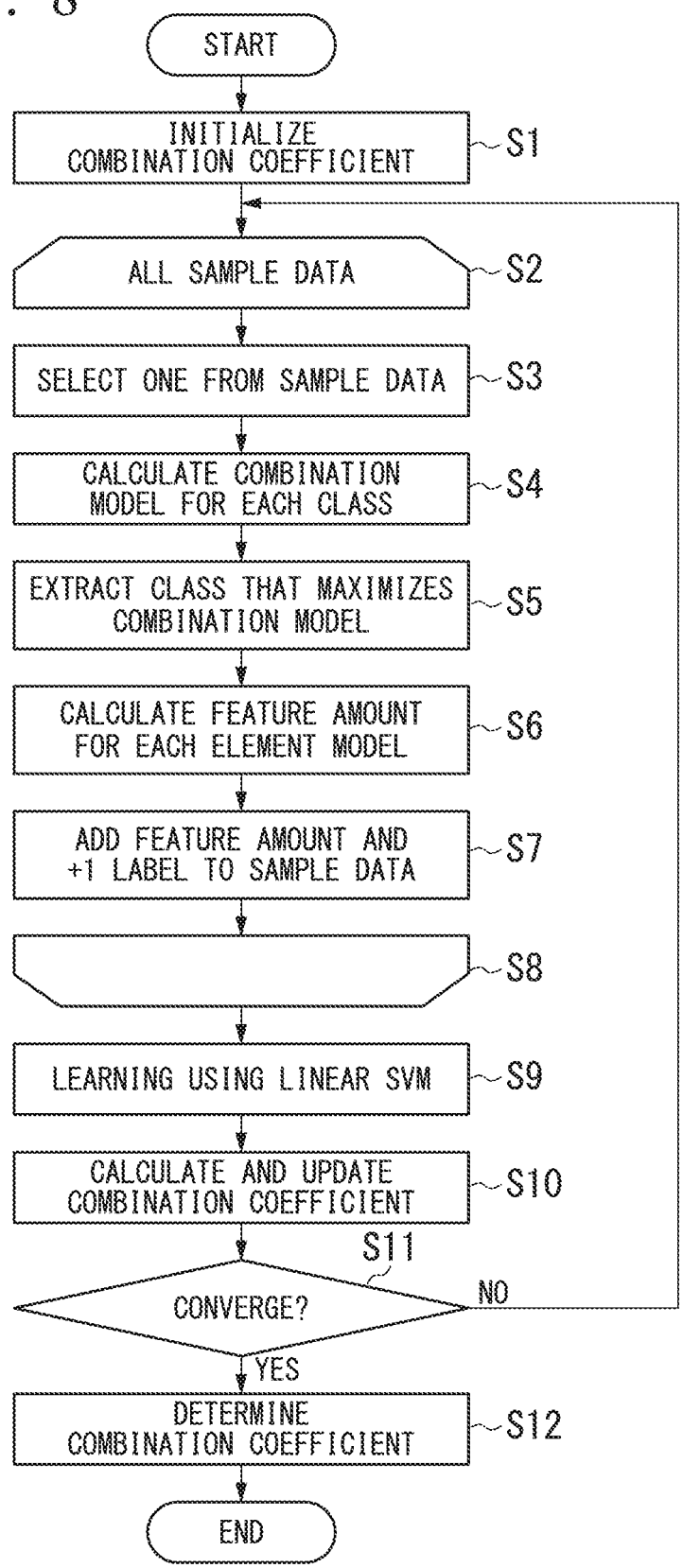
FIG. 8 is a flowchart showing an update method of a combination coefficient according to the first embodiment.

FIG. 8 is a flowchart showing an update method of the combination coefficient W according to the present embodiment.

(Step S1) At the start of the learning mode, the sample selection unit 12 initializes all combination coefficients $w_1$ to $w_4$ stored by the combination coefficient storage unit 13 to one. Subsequently, when controlling the classification apparatus 1 in the learning mode, the control unit 10 outputs information indicating the learning mode to the sample selection unit 12, the speech recognition unit 14, the combination model calculation unit 20, and the weight vector learning unit 21.

(Step S2) The sample selection unit 12 performs processes of Step S3 to Step S7 for each sample data on all sample data stored by the learning sample database 11.

(Step S3) The sample selection unit 12 selects one sample data $x_i$ from the sample data stored by the learning sample database 11.

(Step S4) The combination model calculation unit 20 calculates the combination model $G_j(x_i)$ as a classification result (also referred to as a combination result value) for each class $y_j$. The combination model calculation unit 20 performs the process of Step S4 on all the classes.

(Step S5) The maximum class extraction unit 211 determines a correct solution class $y_i$ and extracts, from the classes calculated by the combination model calculation unit 20 in Step S4, a class $y_{max}$ at which the combination model value is maximized other than the class $y_i$.

(Step S6) The difference calculation unit 212 calculates, as a feature amount, a difference between the correct solution class $y_i$ and the class $y_{max}$ that provides a maximum value for each element model (speech recognition unit 14, motion classification unit 16, slot extraction unit 17, excess and deficiency determination unit 18).

(Step S7) The conversion unit 213 determines, as a feature vector, the difference vector for each classifier output by the difference calculation unit 212 and adds a label +1 to the feature vector.

(Step S8) After the processes of Step S3 to Step S7 on all sample data stored by the learning sample database 11 are completed, the sample selection unit 12 advances the routine to the process of Step S9.

(Step S9) The combination coefficient calculation unit 214 performs learning, using the support vector machine 215 which is a linear SVM, of the feature vector to which the label +1 is added and which is output by the conversion unit 213 with respect to all sample data stored by the learning sample database 11.

(Step S10) The combination coefficient calculation unit 214 calculates a combination coefficient W that maximizes the margin to the support vector and causes the combination coefficient storage unit 13 to store the calculated combination coefficient W, and thereby, the combination coefficient W is updated.

(Step S11) The control unit 10 reads out the combination coefficient stored by the combination coefficient storage unit 13 and determines whether or not the combination coefficient converges. When the control unit 10 determines that the combination coefficient has converged (Step S11; YES), the routine proceeds to the process of Step S12. When the control unit 10 determines that the combination coefficient has not converged (Step S11; NO), the routine returns to the process of Step S2.

(Step S12) The control unit 10 determines the combination coefficient and ends the learning mode.

Then, the classification apparatus 1 ends the update of the combination coefficient W.

<Example of Processes Performed by Speech Recognition Unit 14, Motion Classification Unit 16, Slot Extraction Unit 17, Excess and Deficiency Determination Unit 18, Multiplication Unit 19, Combination Model Calculation Unit 20, and Weight Vector Learning Unit 21>

Next, an example of the processes performed in the learning mode by the speech recognition unit 14, the motion classification unit 16, the slot extraction unit 17, the excess and deficiency determination unit 18, the multiplication unit 19, the combination model calculation unit 20, and the weight vector learning unit 21 is described.

For ease of description, the command used for learning is a single command "Please bring a fork from the kitchen", and the number of classes stored by the learning sample database 11 is three (=L, $class_1$ to $class_3$).

The speech recognition unit 14 performs speech recognition and a morphological analysis on the speech signal "Please bring a fork from the kitchen" and obtains a word string of K recognition results (also referred to as a speech recognition result). The word string of the recognition result is, for example, "Please bri, ng, a fo, rk, from the ki", "Please bring, a, fork, fr, om, the kitchen", or the like. The speech recognition unit 14 calculates, for each word in the recognized word string, a score $S_1 (x_i)$ which is a degree of reliability and outputs the calculated score $S_1 (x_i)$ to the multiplier 191. The speech recognition unit 14 outputs a pair of the word string and the score for each word to the motion classification unit 16 and the slot extraction unit 17.

Next, the motion classification unit 16 classifies a motion classification class by using three support vector machines from each of the K word strings output by the speech recognition unit 14. Here, the three support vector machines are a classifier that classifies the class' "bring", a classifier that classifies the $class_2$ "turn on (the light)", and a classifier that classifies the $class_3$ "turn off (the light)". The motion classification unit 16 calculates, with respect to each of the K word strings output by the speech recognition unit 14, by using the three support vector machines, a score $S_{2,J}(x_i)$ for each support vector machine, that is, for each class and outputs the calculated score $S_{2,J}(x_i)$ to the multiplier 192. The motion classification unit 16 outputs a pair of the classification result (also referred to as a motion classification result) and the score with respect to each of the K word strings to the excess and deficiency determination unit 18. For example, the motion classification unit 16 classifies the $class_1$ "bring" from the first word string, the $class_3$ "turn off (the light)" from the second word string, and the like.

Next, the slot extraction unit 17 extracts a slot from each of the K word strings output by the speech recognition unit 14. The number of slots extracted from each word string is, for example, two from the first word string, one from the second word string, . . . , and two from the K-th word string. The slot extraction unit 17 calculates a score $S_3 (x_i)$ with respect to each of the slots extracted from each of the word strings and outputs the calculated score $S_3 (x_i)$ for each word string and for each slot to the multiplier 193. The slot extraction unit 17 outputs, for each word string, a pair of the extracted slot (also referred to as a slot extraction result) and the score calculated for each slot to the excess and deficiency determination unit 18.

Next, the excess and deficiency determination unit 18 determines whether, in the classification result for each word string output by the motion classification unit 16, the slot extracted by the slot extraction unit 17 from the word string is excess or is deficient based on a relationship between a motion name and a required slot stored by the learning sample database 11. The excess and deficiency determination unit 18 calculates a score $S_4 (x_i)$ based on the determination result of excess and deficiency of the slot and outputs the calculated score $S_4 (x_i)$ to the multiplier 194.

The multiplier 191 multiplies each of the scores $S_1 (x_i)$ for each word string output from the speech recognition unit 14 by the combination coefficient $w_1$ and outputs each multiplied value to the combination model calculation unit 20. The multiplier 192 multiplies each of the scores $S_2 (x_i)$ for each word string output from the motion classification unit 16 by the combination coefficient $w_2$ and outputs each multiplied value to the combination model calculation unit 20. The multiplier 193 multiplies each of the scores $S_3 (x_i)$ for each word string and for each slot output from the slot extraction unit 17 by the combination coefficient $w_3$ and outputs each multiplied value to the combination model calculation unit 20. The multiplier 194 multiplies the score $S_4 (x_i)$ for each word string output from the excess and deficiency determination unit 18 by the combination coefficient $w_4$ and outputs the multiplied value to the combination model calculation unit 20.

The combination model calculation unit 20 acquires the value output by the multiplier 191, the value output by the multiplier 192, the value output by the multiplier 193, and the value output by the multiplier 194. The combination model calculation unit 20 calculates all combinations.

Here, when the command is "Please bring a fork from the kitchen", the correct solution class in the motion classification class is the $class_1$ "bring". The $class_2$ "turn on (the light)" and the $class_3$ "turn off (the light)" are the incorrect solution classes. Therefore, the maximum class extraction unit 211 determines that the class' is the correct solution class. Then, the maximum class extraction unit 211 searches, from all combinations, a speech recognition result in which the motion classification result is a maximum value (score x combination coefficient) and coincides with the correct solution class and the slot extraction result is correct, in the descending order of the speech recognition result value (score x combination coefficient). The maximum class extraction unit 211 determines the score in the speech recognition result that matches the condition as a speech recognition score with respect to the correct solution class. Next, the maximum class extraction unit 211 determines the score in the slot extraction result that matches the condition as a slot extraction score with respect to the correct solution class. Next, the maximum class extraction unit 211 determines the score in the excess and deficiency determination that matches the condition as an excess and deficiency determination score with respect to the correct solution class.

With respect to the incorrect solution classes other than those described above, the maximum class extraction unit 211 uses, for learning, all values of which the motion classification class is the $class_2$ or the $class_3$ of a plurality of combinations, as values other than the correct solution class. Which value of the plurality of combinations is employed as an interpretation (score pair) that corresponds to the incorrect solution class depends on the combination coefficient at each learning time point.

In the present embodiment, an example is described in which the number of classifiers is four and the number of combination coefficients is four; however, the embodiment is not limited thereto. The method of the present embodiment is applicable to a classification apparatus in which the number of classifiers is two or more and the number of combination coefficients is two or more.

The above embodiment is described using an example in which two two-dimensional classes are separated using a separation boundary plane; however, the embodiment is not limited thereto. By using an n-dimensional (n is equal to or more than two) hyperplane, n n-dimensional classes may be separated. The present embodiment is described using an example of linear separation; however, the embodiment is not limited thereto. The weight vector learning unit 21 may set the combination coefficient using the support vector machine 215 in combination with a kernel method.

The present embodiment is described using an example in which a motion and a slot are extracted from a speech signal of a command to the robot 2; however, the embodiment is not limited thereto. A command may correspond to the circumstances in which the classification apparatus 1 is used. The command is not limited to a speech signal. The word to be classified or the word to be extracted may correspond to the command.

Here, a process performed by the classification apparatus 1 in the classification mode is described.

The speech recognition unit 14 acquires a speech signal and performs speech recognition and a morphological analysis on the acquired speech signal similarly to the learning mode. Then, the motion classification unit 16 classifies a motion classification class, with respect to the result of the morphological analysis by the speech recognition unit 14, by using a plurality of support vector machines from each of the word strings output by the speech recognition unit 14 similarly to the learning mode. The slot extraction unit 17 extracts, with respect to the result of the morphological analysis by the speech recognition unit 14, a slot from each of the plurality of word strings output by the speech recognition unit 14 similarly to the learning mode. The excess and deficiency determination unit 18 determines whether, in the classification result for each word string output by the motion classification unit 16, the slot extracted by the slot extraction unit 17 from the word string is excess or is deficient based on a relationship between a motion name and a required slot stored by the learning sample database 11 similarly to the learning mode. Then, the multiplication unit 19 multiplies the score output from each unit by the combination coefficient determined in the learning mode stored by the combination coefficient storage unit 13.

The combination model calculation unit 20 calculates all combinations similarly to the learning mode and outputs the calculation result to the output unit 22. The output unit 22 extracts an output of the motion classification unit 16 and an output of the slot extraction unit 17 that maximize the values output by the combination model calculation unit 20 and outputs, as a classification result, the extracted result to the motion generation unit 25.

Experimental Result

Next, an example of an experimental result of setting the combination coefficient using the classification apparatus 1 of the present embodiment is described. In the experiment, the learning sample database 11 stored 595 commands and set the combination coefficients $w_1$ to $w_4$ by using the 595 sample data. In the experiment, the classification apparatus 1 was formed by using the hardware and software of a computer. The CPU clock frequency of the computer used for the experiment was 1.6 GHz.

FIG. 9 is a view showing the obtained combination coefficient. As shown in FIG. 9, the combination coefficient set by a full search was $w_1=0.2$, $w_2=0.2$, $w_3=0.1$, $w_4=0.1$. The combination coefficient set by the method of the present embodiment was $w_1=0.000948$, $w_2=0.161839$, $w_3=0.000779$, $w_4=0.018409$.

Next, a calculation time required for the calculation of setting the combination coefficient shown in FIG. 9 and a classification accuracy in sample data are described. The accuracy is an accuracy in K-fold cross-validation (for example, refer to "Author: C. M. Bishop, Editorial supervisor: Hiroshi Motoda, Pattern Recognition and Machine Learning, first volume, Maruzen Publishing Co., Ltd., 2012, pp 32").

FIG. 10 is a view showing an accuracy in sample data and the calculation time of a combination coefficient.

As shown in FIG. 10, the accuracy when an initial value is used for the combination coefficient was 77.0%.

The accuracy when using the combination coefficient set by a full search was 87.6%. The calculation time required to set the combination coefficient by the full search was 26401 seconds (=7 hours 20 minutes 1 second). The accuracy when using the combination coefficient set by the method of the present embodiment was 86.7% which was similar to the full search. The calculation time required to set the combination coefficient by the method of the present embodiment was 35 seconds and was about 1/754 of the calculation time of the full search. The result of evaluating the classification result of the present embodiment by using a 24-fold cross-validation was 86.2%. That is, the calculation time of the combination coefficient was the order of $10^4$ according to the method of the related art; on the other hand, it is possible to shorten the calculation time to the order of 10 according to the present embodiment.

As described above, according to the present embodiment, the combination coefficient is set by using the support vector machine, and therefore, it is possible to greatly shorten the calculation time required for setting a combination coefficient having an accuracy which is similar to the accuracy of the combination coefficient set by the full search in comparison with the full search.

According to the present embodiment, in the support vector machine, a constraint in which the separation boundary plane passes through the origin is provided and the +1 label that indicates the correct solution class is imparted to the feature vector in the learning mode. Therefore, it is possible to improve the calculation accuracy, and it is possible to shorten the calculation time.

Second Embodiment

Figure 11:
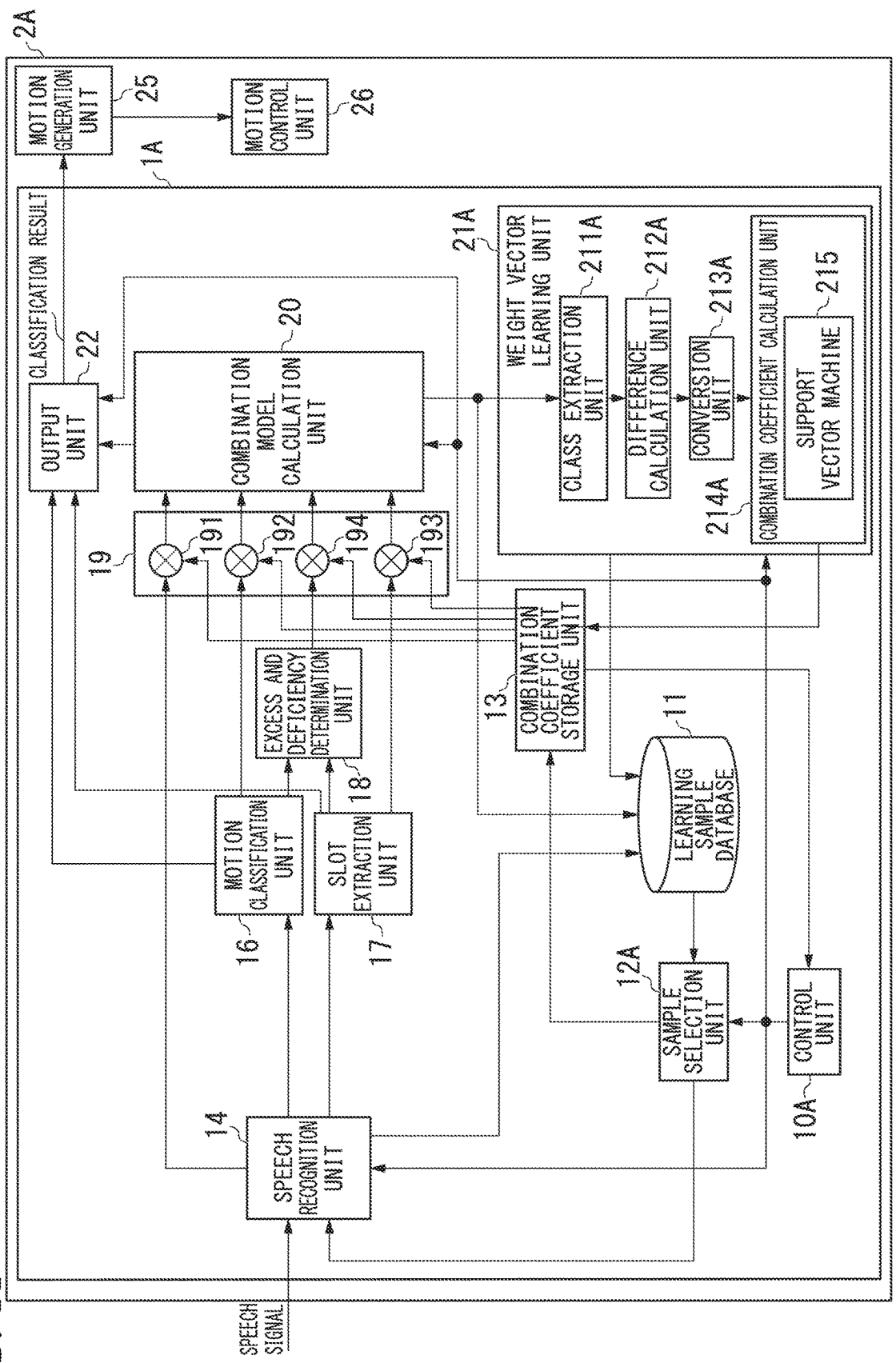
FIG. 11 is a block diagram showing a schematic configuration of a classification apparatus included in a robot according to a second embodiment.

FIG. 11 is a block diagram showing a schematic configuration of a classification apparatus 1A included in a robot 2A according to the present embodiment. The same reference numeral is used for a configuration element having the same function as that of the robot 2 of the first embodiment, and description of the configuration element is omitted.

As shown in FIG. 11, the robot 2A includes a classification apparatus 1A, the motion generation unit 25, and the motion control unit 26. The classification apparatus 1A includes a control unit 10A, the learning sample database 11, a sample selection unit 12A, the combination coefficient storage unit 13, the speech recognition unit 14, the motion classification unit 16, the slot extraction unit 17, the excess and deficiency determination unit 18, the multiplication unit 19, the combination model calculation unit 20 (calculation unit), a weight vector learning unit 21A, and the output unit 22. The weight vector learning unit 21A includes a class extraction unit 211A (extraction unit), a difference calculation unit 212A, a conversion unit 213A, and a combination coefficient calculation unit 214A.

The control unit 10A controls the classification apparatus 1A to switch between a learning mode and a classification mode. When controlling the classification apparatus 1A in the learning mode, the control unit 10A outputs information indicating the learning mode to the sample selection unit 12A, the speech recognition unit 14, the combination model calculation unit 20, and the weight vector learning unit 21A. When controlling the classification apparatus 1A in the classification mode, the control unit 10A outputs information indicating the classification mode to the speech recognition unit 14, the combination model calculation unit 20, and the output unit 22. In the classification mode, the control unit 10A performs classification using the combination coefficient set in the learning mode.

At each time of acquiring information indicating the learning mode output by the control unit 10A, the sample selection unit 12A selects one from the sample data stored by the learning sample database 11 and outputs the selected sample data to the speech recognition unit 14.

The combination model calculation unit 20 adds the values $w_1 \cdot S_{1,j}(x_i)$ to $w_4 \cdot S_{4,j}(x_i)$ output by the multiplication unit 19 using Expression (1).

When the control unit 10A outputs the information indicating the learning mode, the combination model calculation unit 20 outputs, as a classification result, the scores $S_{1,j}(x_i)$ to $S_{4,j}(x_i)$ received from the multiplication unit 19 and a value $G_j(x_i)$ obtained by the addition using Expression (1) to the weight vector learning unit 21A. When the control unit 10A outputs the information indicating the classification mode, the combination model calculation unit 20 outputs the value $G_j(x_i)$ to the output unit 22.

When the control unit 10A outputs the information indicating the learning mode, the weight vector learning unit 21A calculates a combination coefficient W by using the scores $S_{1,j}(x_i)$ to $S_{4,j}(x_i)$ received via the combination model calculation unit 20 and the value $G_j(x_i)$ output by the combination model calculation unit 20 for each of the plurality of sample data stored by the learning sample database 11.

The class extraction unit 211A determines a correct solution class $y_i$ for each element model (speech recognition unit 14, motion classification unit 16, slot extraction unit 17, excess and deficiency determination unit 18) in the values $S_{1,j}(x_i)$ to $S_{4,j}(x_i)$ received from the multiplication unit 19 via the combination model calculation unit 20. The class extraction unit 211A outputs, to the difference calculation unit 212A, a value $S_{k,i}(x_i)$ at the correct solution class $y_i$ and each of values $S_{k,o}(x_i)$ ($o \in \{1, \ldots, J\}$, $o \neq y_i$) at the incorrect solution classes other than the correct solution class.

The difference calculation unit 212A calculates each of differences $d_{k,i}$ between the value $S_{k,i}(x_i)$ at the correct solution class $y_i$ and each of the values $S_{k,o}(x_i)$ at the incorrect solution classes for each classifier k using Expression (2) described above and outputs the calculated difference $d_{k,i}$ for each classifier k to the conversion unit 213A. That is, the difference calculation unit 212A calculates a difference between the correct solution class and the incorrect solution class for each element model (speech recognition unit 14, motion classification unit 16, slot extraction unit 17, excess and deficiency determination unit 18) and thereby calculates a feature amount separate for each class. That is, in the present embodiment, there are a plurality of differences $d_{k,i}$ for each classifier k for each class.

The conversion unit 213A determines, separately for each class, a vector of the difference $d_{k,i}$ for each classifier k output by the difference calculation unit 212A as a feature vector $D_i$ ($=(d_{1,i}, d_{2,i}, d_{3,i}, d_{4,i})$) and adds, to the feature vector $D_i$, a label +1 that indicates the correct solution class to generate the feature vector separately for each class. The conversion unit 213A stores, in the learning sample database 11, the feature vector $D_i$ separate for each class and the label +1 in association with the speech signal which is the command.

The combination coefficient calculation unit 214A performs learning, using the support vector machine 215, of the feature vector $D_i$ to which the label +1 is added and which is output separately for each class by the conversion unit 213 with respect to all sample data stored by the learning sample database 11. The combination coefficient calculation unit 214A calculates the combination coefficient W and causes the combination coefficient storage unit 13 to store the calculated combination coefficient W, and thereby, the combination coefficient W is updated.

Figure 12:
FIG. 12 is a view showing the difference between the first embodiment and the second embodiment.

FIG. 12 is a view showing the difference between the first embodiment and the second embodiment. In FIG. 12, the horizontal axis is $z_1$, and the vertical axis is $z_2$. FIG. 12 shows an example in which feature amounts (point g411, point g412) are present when two incorrect solution classes are present with respect to sample data. The point g411 represents a feature amount of an incorrect solution class (1) of the sample data, and the point g412 represents a feature amount of an incorrect solution class (2) of the sample data.

In the first embodiment, at the learning time of the combination coefficient, the optimization calculation is repeated until convergence by using only a class that maximizes the combination score of the correct solution class and classes other than the correct solution class (incorrect solution classes). Thereby, according to the first embodiment, in a case of noisy data, it is also possible to obtain an advantage in that the calculation process is subject to little influences of the noise. In the example shown in FIG. 12, according to the first embodiment, when the combination of the combination coefficient at a search stage is a state of a line g401, the point g411 is extracted as a maximum value of the incorrect solution class and is used for learning. Further, according to the first embodiment, when the combination of the combination coefficient at the search stage is a state of a line g402, the point g412 is extracted as a maximum value of the incorrect solution class and is used for learning. Which one of the two points is used changes in the process until convergence.

On the other hand, according to the present embodiment, as described above, at the learning time of the combination coefficient, the optimization calculation is performed only once by using the correct solution class and all incorrect solution classes. Thereby, according to the present embodiment, it is possible to reduce the calculation amount. Further, according to the present embodiment, the optimization calculation is performed only once by using and all incorrect solution classes, and thereby, a search is not performed. Therefore, it is possible to prevent the calculation from falling in a local solution. That is, according to the present embodiment, in the example shown in FIG. 12, the combination coefficient is learned by using both the point g411 and the point g412 simultaneously.

Next, an update method of the combination coefficient W in the learning mode in the present embodiment is described.

Figure 13:
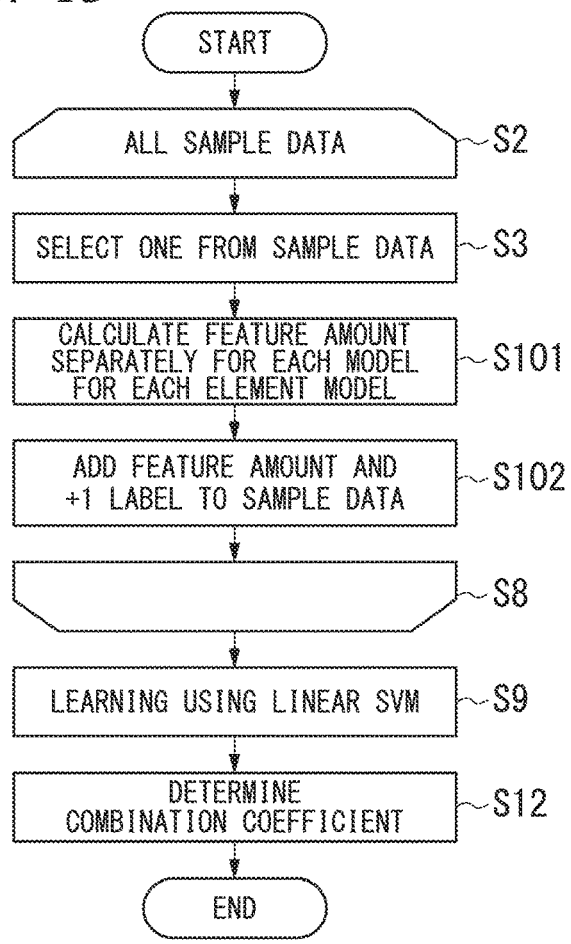
FIG. 13 is a flowchart showing an update method of a combination coefficient according to the second embodiment.

FIG. 13 is a flowchart showing an update method of the combination coefficient W according to the present embodiment. The same reference numeral is used for a process which is similar to that in the flowchart of FIG. 8 described in the first embodiment, and description of the process is omitted.

(Step S2) The sample selection unit 12A performs processes of Step S3, Step S101, and Step S102 for each sample data on all sample data stored by the learning sample database 11.

(Step S3) The sample selection unit 12A selects one sample data $x_i$ from the sample data stored by the learning sample database 11. After the selection, the sample selection unit 12A advances the routine to the process of Step S101.

(Step S101) The combination model calculation unit 20 outputs, to the weight vector learning unit 21A, the values $S_{1,j}(x_i)$ to $S_{4,j}(x_i)$ output by the multiplication unit 19 as is. Subsequently, the class extraction unit 211A extracts, for each element model (speech recognition unit 14, motion classification unit 16, slot extraction unit 17, excess and deficiency determination unit 18), the value $S_{k,i}(x_i)$ at the correct solution class $y_i$ and each of the values $S_{k,o}(x_i)$ at the incorrect solution classes other than the correct solution class. Subsequently, the difference calculation unit 212A calculates each of differences $d_{k,i}$ between the value $S_{k,i}(x_i)$ at the correct solution class $y_i$ and each of the values $S_{k,o}(x_i)$ at the incorrect solution classes for each classifier k using Expression (2). After the calculation, the difference calculation unit 212A advances the routine to the process of Step S102.

(Step S102) The conversion unit 213A determines, separately for each class, a vector of the difference $d_{k,i}$ for each classifier k output by the difference calculation unit 212A as a feature vector $D_i$ and adds, to the feature vector $D_i$, a label +1 that indicates the correct solution class to generate the feature vector separately for each class.

(Step S8) After the processes of Step S3, Step S101, and Step S102 on all sample data stored by the learning sample database 11 are completed, the sample selection unit 12A advances the routine to the process of Step S9.

(Step S9) The combination coefficient calculation unit 214A performs learning, using the support vector machine 215, of the feature vector to which the label +1 is added and which is output separately for each class by the conversion unit 213A with respect to all sample data stored by the learning sample database 11.

The combination coefficient calculation unit 214A advances the routine to the process of Step S12.

(Step S12) The control unit 10A determines the combination coefficient and ends the learning mode.

Then, the classification apparatus 1A ends the update of the combination coefficient W.

According to the classification method of the related art, a plurality of classification planes are required, and classification is performed by averaging the classification planes or the like. Therefore, it is difficult to perform appropriate classification. On the other hand, according to the first embodiment or the second embodiment, by using the difference between the data of the correct solution class and the data of the incorrect solution class, it is possible to normalize data when seen from the support vector machine. Thereby, according to the first embodiment or the second embodiment, it is possible to suitably obtain a classification plane, and therefore, it is possible to improve the classification accuracy.

Further, according to the second embodiment, in a calculation phase of the support vector machine, the calculation is performed using all data of the incorrect solution class, and therefore, it is possible to reduce the number of cases in which the calculation falls in a local solution.

Here, a problem that may occur when the correct solution class and the incorrect solution class are directly classified by using a support vector machine is further described.

Figure 14:
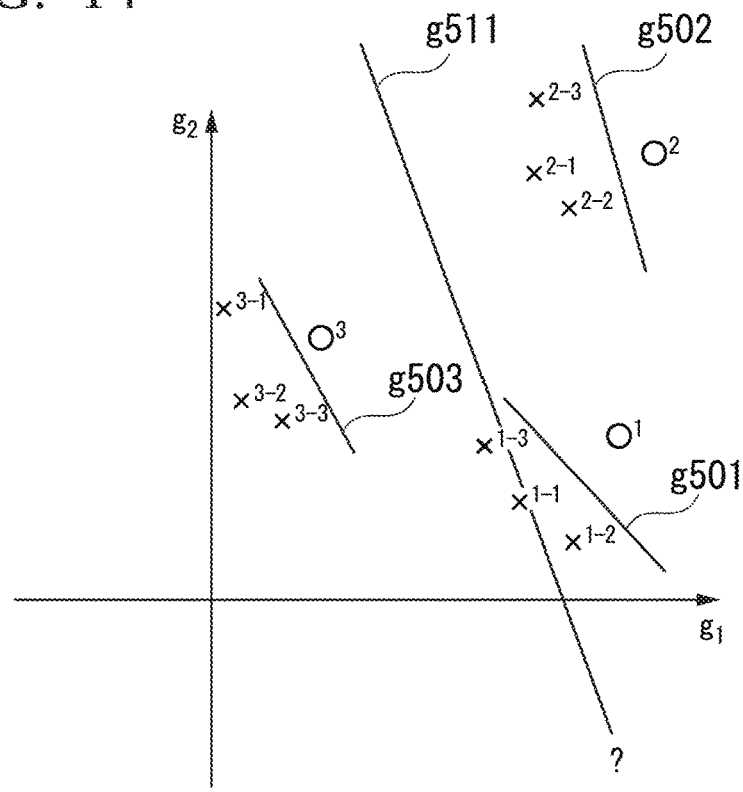
FIG. 14 is a view showing an example of a problem that may occur when a correct solution class and an incorrect solution class are directly classified using a support vector machine.

FIG. 14 is a view showing an example of a problem that may occur when the correct solution class and the incorrect solution class are directly classified using a support vector machine. In FIG. 14, the horizontal axis is $g_1$, and the vertical axis is $g_2$. Each one of reference numerals $g_1$, $g_2$ represents an output (score) with respect to the class of the element model. In FIG. 14, $\bigcirc^n$ represents an n-th evaluation result (pair of scores of g1 and g2) of the correct solution class, and $\times^{n-\{1,2,3\}}$ represents an n-th evaluation result (pair of scores of g1 and g2) of the incorrect solution class. The example shown in FIG. 14 is an example in which, for each sample, one correct solution class is present, and three incorrect solution classes are present.

As shown in FIG. 14, a plane that classifies the correct solution class and the incorrect solution class for the first evaluation result ($\bigcirc^1$, $\times^{1-1}$, $\times^{1-2}$, $\times^{1-3}$) is g501. A plane that classifies the correct solution class and the incorrect solution class for the second evaluation result ($\bigcirc^2$, $\times^{2-1}$, $\times^{2-2}$, $\times^{2-3}$) is g502. A plane that classifies the correct solution class and the incorrect solution class for the third evaluation result ($\bigcirc^3$, $\times^{3-1}$, $\times^{3-2}$, $\times^{3-3}$) is g503. In this way, the plane that classifies the correct solution class and the incorrect solution class may be different for each sample data. Even when it is attempted to average the planes together to set a single separation boundary plane g511, there may be a case in which the single separation boundary plane g511 cannot be successfully set.

Therefore, in the first embodiment and the second embodiment, the difference between the correct solution class and the incorrect solution class is calculated to calculate a plane for separation. The reason is further described using FIG. 15.

Figure 15:
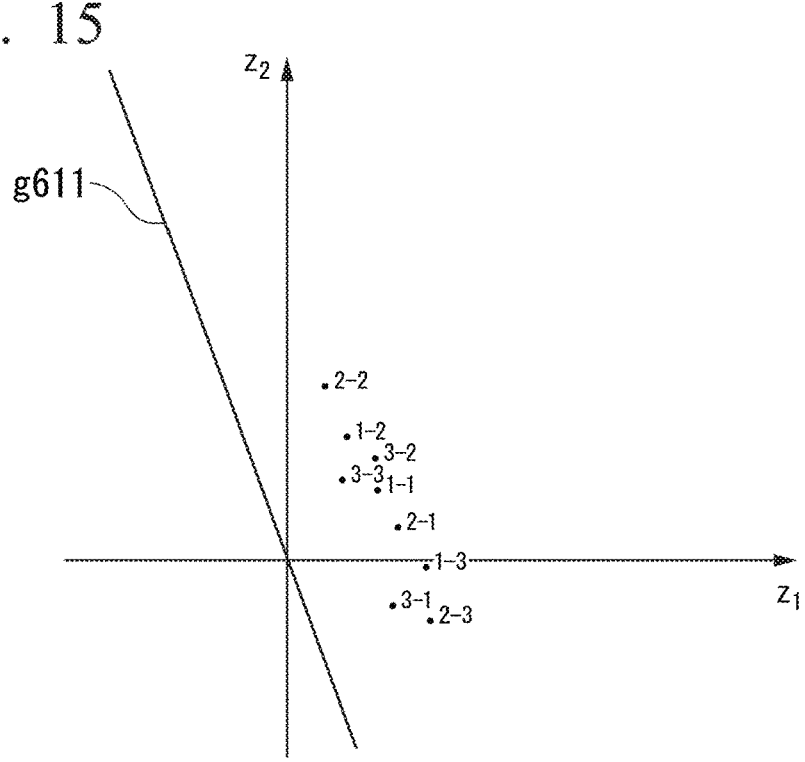
FIG. 15 is a view showing an advantage of calculating the difference between the correct solution class and the incorrect solution class in the first embodiment and the second embodiment.

FIG. 15 is a view showing an advantage of calculating the difference between the correct solution class and the incorrect solution class in the first embodiment and the second embodiment. In FIG. 15, the horizontal axis is $z_1$, and the vertical axis is $z_2$. In FIG. 15, $\bullet^{n-j}$ represents difference data calculated from the evaluation result $\bigcirc^n$ of the correct solution class and the evaluation result $\times^{n-\{1,2,3\}}$ of the incorrect solution class of FIG. 14.

In the related art, even if difference data calculated from the evaluation result $\bigcirc^n$ of the correct solution class and the evaluation result $\times^{n-\{1,2,3\}}$ of the incorrect solution class is calculated, according to the calculated difference data as is, two classes of the correct data and the incorrect data become a single class. Therefore, according to the method using a support vector machine of the related art, a separation boundary plane that separates the correct solution class and the incorrect solution class cannot be obtained.

Therefore, in the first embodiment and the second embodiment, in order to obtain a separation boundary plane g611, a +1 label is added such that the bias of the separation boundary plane is fixed to zero, that is, the separation boundary plane passes through the origin. Thereby, according to the first embodiment and the second embodiment, even when a single class is present after calculating the difference, it is possible to obtain the separation boundary plane by using the margin maximization principle.

A program for realizing part of or all of the functions of the classification apparatus 1 (or 1A) or the robot 2 (or 2A) according to the invention may be recorded in a computer-readable recording medium, the program recorded in the recording medium may be read into and executed on a computer system to thereby perform the process described above. It is assumed that the term "computer system" used herein includes an OS or hardware, such as peripherals. It is also assumed that the term "computer system" includes a WWW system which includes a homepage providing environment (or a display environment). The term "computer-readable recording medium" refers to a portable medium such as a flexible disk, a magneto-optical disk, a ROM, or a CD-ROM or a storage device such as a hard disk embedded in the computer system. It is also assumed that the term "computer-readable recording medium" includes a medium which holds a program for a given time, such as a volatile memory (RAM) in the computer system which becomes a server or a client when a program is transmitted through a network such as the Internet or a communication line such as a telephone line.

The program may be transmitted from the computer system which stores the program in the storage device or the like, to other computer systems through a transmission medium or through transmission waves in the transmission medium. The term "transmission medium" which transmits the program refers to a medium which has a function of transmitting information, for example, a network (communication network) such as the Internet or a communication line such as a telephone line. The program may be a program which can realize part of the above-described functions. The program may be a so-called differential file (differential program) which can realize the above-described functions by a combination with a program already recorded in the computer system.

The invention claimed is:

1. A classification apparatus comprising:
a processor configured to include a learning mode and a classification mode and coupled to a memory that stores learning data including data of at least two motion classification classes,
wherein in the learning mode, the processor is configured to:
output, as a classification result, a combination result value obtained by linear combination, using a combination coefficient, of result values which are results of classification by each of a plurality of classifiers with respect to the learning data;
extract a correct solution class which is a motion classification class having the largest combination result value among output combination result values of the at least two motion classification classes and an incorrect solution class which is a motion classification class other than the correct solution class for each of the classifiers from the classification result;
calculate a difference between a result value of the extracted correct solution class and a result value of the extracted incorrect solution class for each of the classifiers;
calculate a feature vector using the calculated difference for each of the classifiers; and
update the combination coefficient based on learning, using a plurality of support vector machines each performing classification on each of the at least two motion classification classes, of a value based on the feature vector with respect to a plurality of the learning data,
wherein in the classification mode, the processor is configured to classify input data using the combination coefficient updated in the learning mode.

2. The classification apparatus according to claim 1, wherein
the processor extracts all the incorrect solution classes from the classification result, and
the processor calculates a difference between the result value of the correct solution class and each of the result values of all the incorrect solution classes for each of the classifiers and separately for each motion classification class.

3. The classification apparatus according to claim 2, wherein
the processor extracts a maximum value of the result value of the incorrect solution classes from the classification result, and
the processor calculates a difference between a result value of learning data in the correct solution class and a result value of learning data in a motion classification class in which the combination result value is maximum among the incorrect solution classes for each of the classifiers.

4. The classification apparatus according to claim 1, wherein
the processor converts the calculated feature vector to the value based on the feature vector by adding a +1 label that indicates a correct solution class to the calculated feature vector, and
the processor updates the combination coefficient to a combination coefficient at which a margin between a classification boundary and a support vector is maximized.

5. The classification apparatus according to claim 4, wherein
the classification boundary passes through an origin.

6. The classification apparatus according to claim 4, wherein
an initial value of the combination coefficient is one, and
the processor repeats learning until the margin between the classification boundary and the support vector converges to update the combination coefficient.

7. The classification apparatus according to claim 1, wherein
the learning data and the input data are a speech signal that includes a word representing a command of motion and a noun, and
each of the plurality of classifiers is a classifier that performs speech recognition, a classifier that classifies a word representing a motion included in a result of the speech recognition, a classifier that classifies a noun included in the result of the speech recognition, and a classifier that classifies whether or not the word representing the motion and the noun have been extracted based on a score.

8. A robot comprising a classification apparatus according to claim 1, wherein
a speech signal of the learning data is a speech signal of a command that prompts a motion of the robot.

9. A classification method, implemented via a processor configured to include a learning mode and a classification mode and coupled to a memory that stores learning data including data of at least two motion classification classes, comprising:
(a) in the learning mode, outputting, as a classification result, a combination result value obtained by linear combination, using a combination coefficient, of result values which are results of classification by each of a plurality of classifiers with respect to the learning data;
(b) in the learning mode, extracting a correct solution class which is a motion classification class having the largest combination result value among output combination result values of the at least two motion classification classes and an incorrect solution class which is a motion classification class other than the correct solution class for each of the classifiers from the classification result;
(c) in the learning mode, calculating a difference between a result value of the extracted correct solution class and a result value of the extracted incorrect solution class for each of the classifiers;
(d) in the learning mode, calculating a feature vector using the calculated difference for each of the classifiers;
(e) in the learning mode, calculating a feature vector using the calculated difference for each of the classifiers and converting the calculated feature vector to a value based on the feature vector by adding a +1 label that indicates a correct solution class to the calculated feature vector;

(f) in the learning mode, updating the combination coefficient to a combination coefficient at which a margin between a classification boundary that passes through an origin and a support vector is maximized based on learning, using a plurality of support vector machines each performing classification on each of the at least two motion classification classes, of the value based on the feature vector with respect to a plurality of the learning data; and (g) in the classification mode, classifying input data using the combination coefficient updated in the learning mode.

\* \* \* \* \*